(12) United States Patent
Lee

(10) Patent No.: US 10,908,387 B2
(45) Date of Patent: Feb. 2, 2021

(54) OPTICAL LENS ASSEMBLY AND ELECTRONIC APPARATUS HAVING THE SAME

(71) Applicant: Samsung Electronics Co., Ltd., Gyeonggi-do (KR)

(72) Inventor: Ki-woo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 16/127,405

(22) Filed: Sep. 11, 2018

(65) Prior Publication Data

US 2019/0086638 A1   Mar. 21, 2019

(30) Foreign Application Priority Data

Sep. 20, 2017   (KR) .......................... 10-2017-0121319

(51) Int. Cl.
*G02B 9/60*   (2006.01)
*G02B 13/06*  (2006.01)
(Continued)

(52) U.S. Cl.
CPC .................. *G02B 9/60* (2013.01); *G02B 9/64* (2013.01); *G02B 13/0045* (2013.01);
(Continued)

(58) Field of Classification Search
CPC ...... G02B 13/0045; G02B 9/60; G02B 13/18; G02B 3/04; G02B 27/0025;
(Continued)

(56) References Cited

U.S. PATENT DOCUMENTS

| 5,731,911 A | 3/1998 | Kagoshima |
| 7,224,498 B2 | 5/2007 | Tochigi |

(Continued)

FOREIGN PATENT DOCUMENTS

| JP | H04-328707 | 11/1992 |
| JP | 6-175027 A | 6/1994 |

(Continued)

OTHER PUBLICATIONS

International Search Report dated Jan. 8, 2019.

(Continued)

*Primary Examiner* — William R Alexander
*Assistant Examiner* — Sharrief I Broome
(74) *Attorney, Agent, or Firm* — Cha & Reiter, LLC.

(57) ABSTRACT

Provided are an optical lens assembly and an electronic apparatus having the same. The optical lens assembly having a plurality of lenses arranged from an object side toward an image side where an image sensor is disposed, includes a bending unit configured to reflect light input from the object side in a first direction toward a second direction; and a first lens group having negative refractive power, a second lens group having positive refractive power, and a third lens group having negative refractive power, which are arranged in the second direction in order from the bending unit toward the image side. The first lens group includes a first lens having negative refractive power and disposed adjacent to the bending unit and a second lens having positive refractive power.

17 Claims, 19 Drawing Sheets

(51) Int. Cl.
*H04N 5/335* (2011.01)
*H04N 5/232* (2006.01)
*G02B 27/00* (2006.01)
*G02B 13/00* (2006.01)
*G02B 9/64* (2006.01)
*H04N 5/225* (2006.01)

(52) U.S. Cl.
CPC ......... *G02B 13/06* (2013.01); *G02B 27/0037* (2013.01); *H04N 5/2254* (2013.01); *H04N 5/23248* (2013.01); *H04N 5/23287* (2013.01); *H04N 5/335* (2013.01)

(58) Field of Classification Search
CPC .... G02B 13/0015; G02B 13/04; G02B 15/14; G02B 13/00; G02B 5/005; G02B 15/173; G02B 13/001; G02B 13/06; G02B 15/177; G02B 7/021; G02B 7/08; G02B 13/02; G02B 13/22; G02B 27/646; G02B 9/64; H04N 5/2254; H04N 5/2257; H04N 5/225; H04N 5/2253; H04N 5/2252; H04N 5/23245; H04N 5/23296; H04N 5/3572; H04N 9/317
See application file for complete search history.

(56) References Cited

U.S. PATENT DOCUMENTS

| | | |
|---|---|---|
| 7,809,256 B2 | 10/2010 | Kuroda et al. |
| 8,094,381 B2 | 1/2012 | Mihara et al. |
| 8,300,119 B2 | 10/2012 | Seo |
| 2003/0161013 A1* | 8/2003 | Tochigi .................. G02B 13/24 358/509 |
| 2008/0316609 A1* | 12/2008 | Robinson ........... G02B 27/0025 359/664 |
| 2010/0123950 A1* | 5/2010 | Fujiwara ................. G02B 21/02 359/368 |
| 2012/0113231 A1* | 5/2012 | Kim ..................... H04N 13/271 348/47 |
| 2012/0162769 A1* | 6/2012 | Suzuki ............... G02B 13/0045 359/558 |
| 2013/0335605 A1 | 12/2013 | Kuo |
| 2015/0103243 A1* | 4/2015 | Lin ......................... G02B 9/60 348/376 |
| 2015/0109485 A1 | 4/2015 | Ozaki et al. |
| 2016/0062136 A1 | 3/2016 | Nomura et al. |

FOREIGN PATENT DOCUMENTS

| | | |
|---|---|---|
| JP | 2003-202495 A | 7/2003 |
| JP | 2013-101213 A | 5/2013 |
| KR | 10-1019091 B1 | 3/2011 |
| KR | 10-1617794 B1 | 5/2016 |
| KR | 10-2016-0109473 A | 9/2016 |

OTHER PUBLICATIONS

Gross, et al.; "Handbook of Optical Systems, vol. 3: Aberration Theory and Correction of Optical Systems"; Jan. 1, 2007; XP055258161; pp. 377-379.

European Search Report dated Jul. 3, 2020.

* cited by examiner

OPTICAL LENS ASSEMBLY AND ELECTRONIC APPARATUS HAVING THE SAME

CROSS-REFERENCE TO RELATED APPLICATION

This application is based on and claims priority under 35 U.S.C. § 119 to Korean Patent Application No. 10-2017-0121319, filed on Sep. 20, 2017, in the Korean Intellectual Property Office, the disclosure of which is incorporated by reference herein in its entirety.

BACKGROUND

1. Field

The disclosure generally relates to an optical lens assembly and an electronic apparatus having the same, such as a wide-angle optical lens assembly capable of zooming and an electronic apparatus having the same.

2. Description of Related Art

Electronic apparatuses are capable of an increasing number of services and functions. Electronic apparatuses such as mobile devices or user devices may provide various services using various sensor modules. These electronic apparatuses may provide a multimedia service such as photo or video. As the use of these electronic apparatuses increases, cameras functionally connected to the electronic apparatuses have increasingly become commonplace. As such, performance and/or resolution of the camera have improved according to the user's demand. A variety of images, such as landscapes, portraits, or selfies, can be taken by using the camera of an electronic apparatus. Such images, including photos and videos, can be shared through social network sites or other media.

With the development of semiconductor and display technologies, camera lenses for mobile devices have been developed from low resolution to high resolution, from having compact sensors to having large sensors, for example, from ⅛" sensors to ½" sensors, and from having telephoto lenses to having super wide-angle lenses.

In digital cameras, zoom images having high resolution may be obtained by using a general zoom lens. However, generally, the size of the zoom lens assembly is relatively large. Thus, it is difficult to apply the zoom lens to a compact mobile device.

Recently, to obtain high-resolution zoom images in compact mobile devices, manufacturers have used a wide-angle camera and a telephoto camera arranged in a dual module. Using this technology, zoom images may be obtained from compact cameras that can be mounted on a compact mobile device. However, using such dual camera systems, zoom images of an intermediate area between the wide angle and the telephoto is obtained through digital image processing. Thus, it is difficult to obtain a high-resolution image of the intermediate area. Furthermore, when the focal length of the telephoto lens increases so that the zoom ratio increases, it is further difficult to obtain a high quality image of the intermediate area.

SUMMARY

One or more embodiments disclosed herein include a wide-angle optical lens assembly capable of zooming, for example, in an electronic apparatus (e.g. a portable terminal).

One or more embodiments disclosed herein include an electronic apparatus having, for example, a wide-angle optical lens assembly capable of zooming.

One or more embodiments disclosed herein include an electronic apparatus having an extended zoom ratio range by including a plurality of optical lens assemblies having different fields of view.

Additional aspects will be set forth in part in the description which follows and, in part, will be apparent from the description, or may be learned by practice of the presented embodiments.

In accordance with an aspect of the disclosure, an optical lens assembly having a plurality of lenses arranged from an object side toward an image side where an image sensor is disposed, includes a bending unit configured to reflect light input from the object side in a first direction toward a second direction; and a first lens group having negative refractive power, a second lens group having positive refractive power, and a third lens group having negative refractive power, which are arranged in the second direction in order from the bending unit toward the image side, wherein the first lens group comprises a first lens having negative refractive power and disposed adjacent to the bending unit and a second lens having positive refractive power, the second lens group comprises one or more lenses that are movable in the second direction, the third lens group is movable in the second direction and comprises a third lens having positive refractive power and a fourth lens having negative refractive power, and an effective diameter of each of the first lens, the second lens, the one or more lenses included in the second lens group, the third lens, and the fourth lens is less than a diameter of an image circle of the image sensor.

In accordance with another aspect of the disclosure, an electronic apparatus includes a first optical lens assembly having a first field of view, a first image sensor configured to obtain a first image signal by using light passing through the first optical lens assembly, a second optical lens assembly having a second field of view that is less than the first field of view, a second image sensor configured to obtain a second image signal by using light passing through the second optical lens assembly, and a processor, wherein the second optical lens assembly includes a bending unit configured to reflect light input from an object side in a first direction toward a second direction, a first lens group having negative refractive power, a second lens group having positive refractive power, and a third lens group having negative refractive power, which are arranged in the second direction in order from the bending unit toward an image side where the second image sensor is disposed, wherein the first lens group is disposed adjacent to the bending unit and comprises a first lens having negative refractive power and a second lens having positive refractive power, the second lens group comprises one or more lenses that are movable in the second direction, the third lens group is movable in the second direction and comprises a third lens having positive refractive power and a fourth lens having negative refractive power, and an effective diameter of each of the first lens, the second lens, the one or more lenses included in the second lens group, the third lens, and the fourth lens is less than a diameter of an image circle of the second image sensor.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
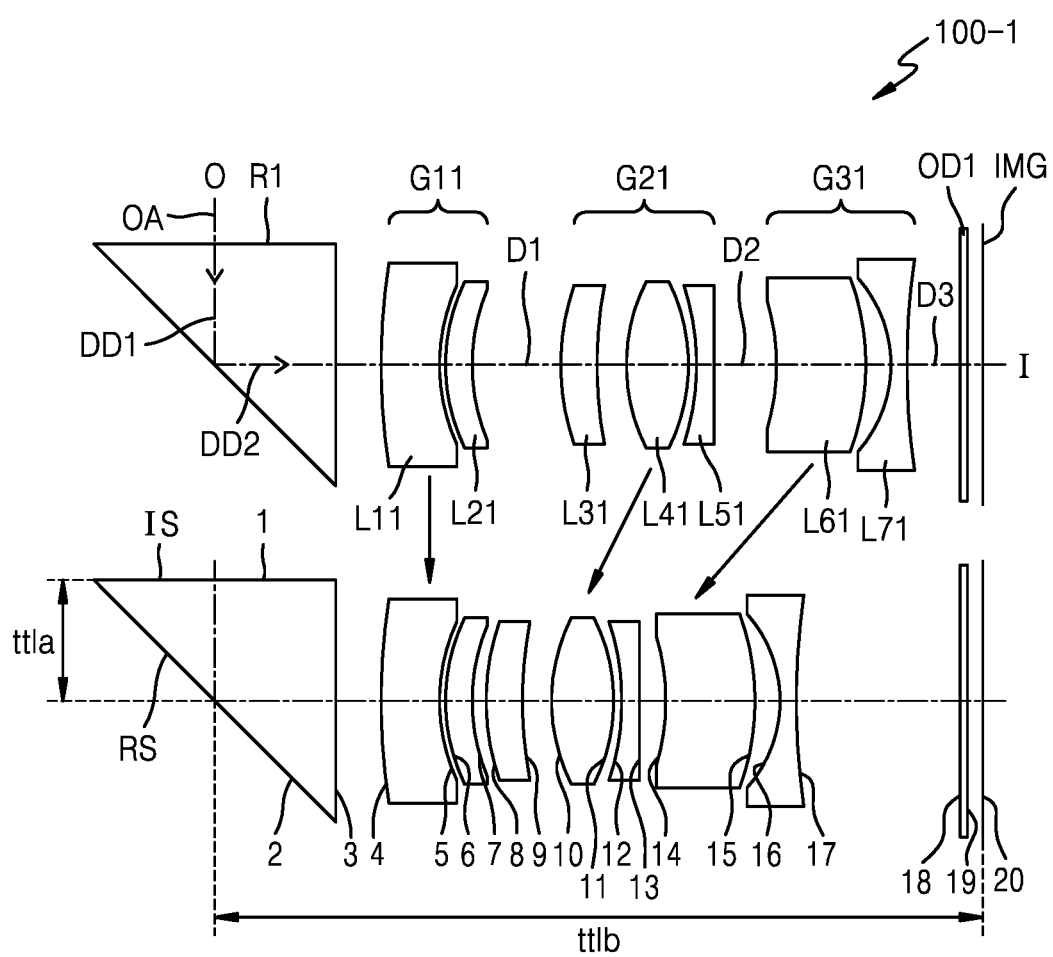
FIG. 1 illustrates an optical lens assembly of a first numerical embodiment according to various embodiments.

Optical lens assemblies according to the disclosed embodiments and an electronic apparatus including the same will be illustrated in the drawings and described in detail in the written description. However, as the present disclosure allows for various changes and numerous other embodiments, this is not intended to limit the present disclosure to particular modes of practice, and it is to be appreciated that various modifications, equivalents, and/or alternatives that do not depart from the spirit and technical scope of the present disclosure are encompassed in the present disclosure. In the description of the present disclosure, certain detailed explanations of the related art are omitted when it is deemed that they may unnecessarily obscure the essence of the disclosure. Throughout the drawings, like reference numerals denote like elements.

In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In the present specification, the expressions such as "A or B," "at least one of A and/or B," or "at least one or more of A and/or B" may include all available combinations of items listed together. For example, the expressions such as "A or B," "at least one of A and B," or "at least one of A or B" may signify all cases of (1) including at least one A, (2) including at least one B, or (3) including both of at least one A and at least one B.

Terms such as "first" and "second" are used herein merely to describe a variety of constituent elements, but the constituent elements are not limited by the terms. Such terms are used only for the purpose of distinguishing one constituent element from another constituent element. For example, without departing from the right scope of the present disclosure, a first constituent element may be referred to as a second constituent element, and vice versa.

In the present specification, when a constituent element, e.g., a first constituent element, is "(operatively or communicatively) coupled with/to" or is "connected to" another constituent element, e.g., a second constituent element, the constituent element contacts or is connected to the other constituent element directly or through at least one of other constituent elements, e.g., a third constituent element. Conversely, when a constituent element, e.g., a first constituent element, is described to "directly connect" or to be "directly connected" to another constituent element, e.g., a second constituent element, the constituent element should be construed to be directly connected to another constituent element without any other constituent element, e.g., a third constituent element, interposed therebetween. Other expressions, such as "between" and "directly between," describing the relationship between the constituent elements, may be construed in the same manner.

In the present specification, the expression "configured to" may be interchangeable with an expression such as "suitable for," "having the capacity to," "designed to," "adapted to," "made to," or "capable of." The expression "configured to" does not necessarily signify one that is "specifically designed to" in hardware. Instead, in some situations, the expression "configured to" may signify one that is "capable of" performing a function with other device or parts. For example, an expression "a processor configured to perform functions A, B, and C" may signify a dedicated processor, for example, an embedded processor, for performing the functions or a generic-purpose processor, for example, a CPU or an application processor, capable of performing the functions by executing one or more software programs stored in a memory device.

The terms used in the present disclosure have been selected from currently widely used general terms in consideration of the functions in the present disclosure. However, the terms may vary according to the intention of one of ordinary skill in the art, case precedents, and the advent of new technologies. Also, in special cases, meanings of the terms selected by the applicant are described in detail in the description section. Accordingly, such terms used in the present disclosure are defined based on their meanings in relation to the contents discussed throughout the specification, and may not be defined by their ordinary meanings.

The term "electronic apparatus" according to various embodiments of the present disclosure may include at least one of smartphones, tablet personal computers, mobile phones, video phones, e-book readers, desktop personal computers (PCs), laptop personal computers (PCs), netbook computers, workstations, servers, personal digital assistants (PDAs), portable multimedia players (PMPs), MP3 players, mobile medical devices, cameras, and wearable devices. According to various embodiments, a wearable device may include at least one of an accessory type, e.g., watches, rings, bracelets, anklets, necklaces, glasses, contact lenses, or head-mounted devices (HMD), a fabric or garment integrated type, e.g., electronic apparel, a body attached type, e.g., skin pads or tattoos, or a body implantable type, e.g., implantable circuits.

In various embodiments, the electronic apparatus may be home appliances. Home appliances may include at least one of, for example, televisions, digital video disk (DVD) players, audio systems, refrigerators, air conditioners, vacuum cleaners, ovens, microwaves, washing machines, air cleaners, set-top boxes, home automation control panels, security control panels, TV boxes such as Samsung's HomeSync™, Apple's TV™, or Google's TV™, game consoles such as Xbox™ or PlayStation™, electronic dictionaries, electronic keys, camcorders, and electronic photo frames.

In another embodiment, the electronic apparatus may include at least one of various medical devices such as various portable medical measuring instruments including a blood glucose meter, a heart rate meter, a blood pressure meter, or a temperature measuring instrument, magnetic resonance angiography (MRA) device, magnetic resonance imaging (MRI) device, computed tomography (CT) device, imaging apparatuses, or ultrasonic devices, navigation systems, global navigation satellite systems (GNSS), event data recorders (EDR), flight data recorders (FDR), automotive infotainment devices, marine electronic equipment such as a marine navigation system or a gyro compass, avionics, security devices, automobile head units, industrial or home robots, automotive teller's machines of financial institutions, points of sales (POS) of stores, and Internet of Things (IoT) devices such as light bulbs, various sensors, electric or gas meters, sprinkler devices, fire alarms, thermostats, street lights, toasters, exercise equipment, hot water tanks, heaters, boilers, etc.

In various embodiments, the electronic apparatus may include at least one of a part of furniture or a building/structure, an electronic board, an electronic signature receiving device, a projector, and a variety of measuring instruments, such as, a water, electricity, gas, or radio wave measuring instrument, etc. In various embodiments, the electronic apparatus may be one of the above-described devices and a combination thereof. In various embodiments, the electronic apparatus may be a flexible electronic apparatus. Furthermore, the electronic apparatus according to the present embodiment is not limited to the above-described devices, and may include a new electronic apparatus according to the development of technologies.

In the specification, the term "user" may indicate a user who uses the electronic apparatus or an apparatus that uses the electronic apparatus, for example, an artificial intelligent electronic apparatus.

Hereinafter, optical lens assemblies according to various embodiments, and apparatuses having the same, are described below in detail with reference to the accompanying drawings.

FIG. 1 illustrates an optical lens assembly 100-1 of a first numerical embodiment according to various embodiments.

The optical lens assembly 100-1 according to the present embodiment may include a bending unit R1 for changing the direction of an optical axis OA, a first lens group G11 having negative refractive power, a second lens group G21 having positive refractive power, and a third lens group G31 having negative refractive power, which are arranged on the optical axis OA from an object side O toward the image side I.

In the description of the configuration of the respective lenses, the image side I may denote, for example, a direction toward an image plane IMG where an image is formed or a direction toward an image sensor, and the object side O may denote a direction toward an object whose image is to be captured. Furthermore, an "object side surface" of a lens may denote, for example, a lens surface facing the object when the lens is on the optical axis OA. An expression of "toward the image side surface" may denote, for example, a lens surface facing the image plane IMG when the lens is on the optical axis OA. The image plane IMG may be, for example, a surface of an imaging device or an image sensor. An image sensor may include a sensor such as a complementary metal-oxide semiconductor (CMOS) image sensor or a charge-coupled device (CCD) image sensor. The image sensor is not limited thereto, and may be, for example, a device that converts an image of the object to an electric image signal.

In the present disclosure, the object side O and the image side I may be set assuming a bent optical axis.

The bending unit R1 may change the direction of the optical axis OA from a first direction DD1 to a second direction DD2 that is different from the first direction DD1. The bending unit R1 may change the direction of the optical axis OA of the optical lens assembly 100-1 by reflecting incident light from the object side O in the first direction DD1 to the second direction DD2. For example, the bending unit R1 may include a reflection mirror or a prism. A prism may be made of, for example, glass or plastic. The bending unit R1 is closest to the object side O in the optical lens assembly 100-1, and no lens may be provided between the bending unit R1 and the object.

The first lens group G11, the second lens group G21, and the third lens group G31 may be arranged in the second direction DD2.

The first lens group G11 may include a first lens L11 having negative refractive power and adjacent to the bending unit R1 and a second lens L21 having positive refractive power, which are arranged in order from the object side O toward the image side I. In the first lens group G11, the first lens L11 may be arranged closest to the object side O, and the second lens L21 may be arranged closest to the image side I. The first lens L11 may have, for example, a meniscus shape which is convex toward the object side O. The second lens L21 may have, for example, a meniscus shape which is convex toward the object side O. However, the shapes of the first lens L11 and the second lens L21 are not limited thereto. The first lens group G11 may be fixed during zooming.

The first lens L11 may have negative refractive power, and the second lens L21 may have positive refractive power. The first lens L11 may have an Abbe number greater than 50, and the second lens L21 may have an Abbe number less than 30. In this case, when the optical lens assembly 100-1 according to the present embodiment performs auto-focusing, high resolution may be maintained without deterioration of optical performance.

The second lens group G21 may be moved in the second direction DD2 for zooming. The second lens group G21 may include, for example, a third lens L31, a fourth lens L41 having positive refractive power, and a fifth lens L51 having negative refractive power. The third lens L31 may have, for example, a meniscus shape which is convex toward the object side O. The fourth lens L41 may be, for example, a biconvex lens. The fifth lens L51 may have, for example, a meniscus shape which is concave toward the object side O.

The third lens group G31 may be moved in the second direction DD2 for zooming. The third lens group G31 may include, for example, a sixth lens L61 having positive refractive power and a seventh lens L71 having negative refractive power. The sixth lens L61 may have, for example, an object side surface which is concave toward the object side O. The sixth lens L61 may have, for example, a meniscus shape which is concave toward the object side O. The seventh lens L71 may include, for example, an object side surface which is concave toward the object side O. The seventh lens L71 may be, for example, a biconcave lens.

In the optical lens assembly according to various embodiments, the first lens group may perform the focus function of correcting the image plane position depending on the distance to the object. Furthermore, the first lens group may efficiently reduce various aberrations including chromatic aberration, thereby maintaining resolving power. Furthermore, the third lens group including two lenses having positive and negative refractive powers may efficiently reduce chromatic aberration and astigmatic field curves and may perform focus functions as necessary.

According to various embodiments, camera shake error during photographing using the camera may be compensated for.

Figure 2:
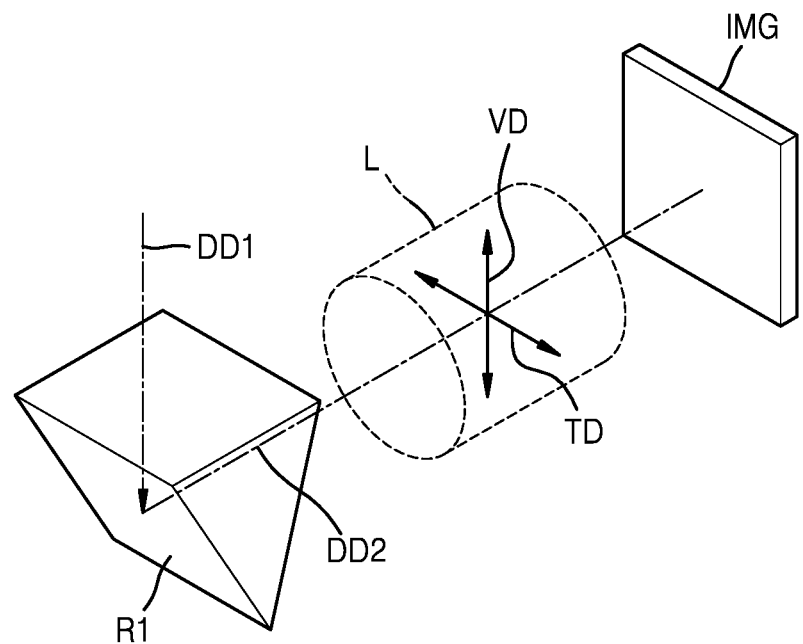
FIG. 2 illustrates an example of camera shake compensation in an optical lens assembly according to various embodiments.

As illustrated in FIG. 2, camera shake compensation may be performed by moving the first lens group G11, the second lens group G21, and the third lens group G31 in a vertical direction VD and a horizontal direction TD with respect to the second direction DD2. In FIG. 2, for convenience of explanation, the first lens group G11, the second lens group G21, and the third lens group G31 are indicated by L.

Figure 3:
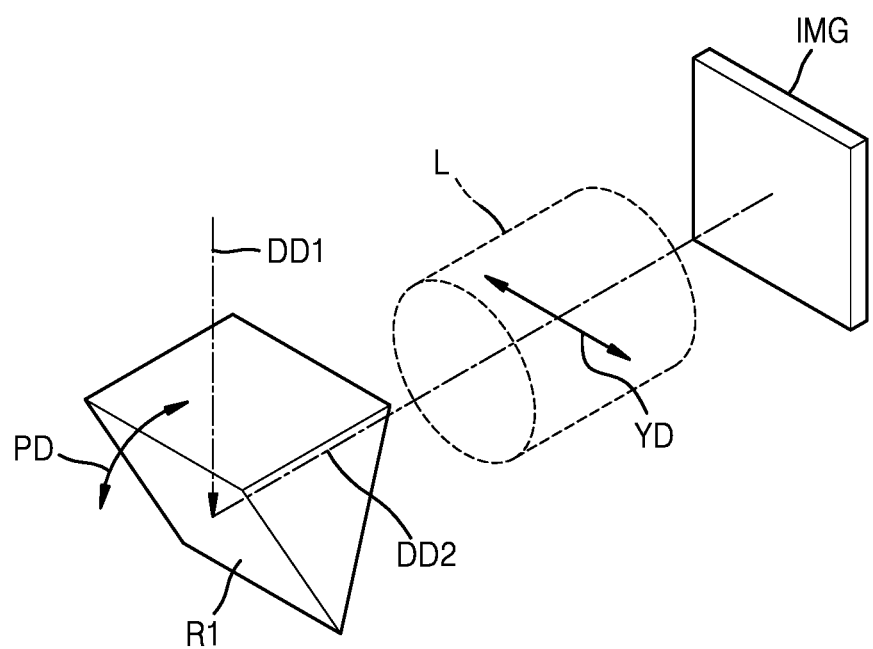
FIG. 3 illustrates another example of camera shake compensation in an optical lens assembly according to various embodiments.

Alternatively, as illustrated in FIG. 3, as the bending unit R1 tilts, camera shake compensation in a pitch direction PD may be performed, and as the first lens group G11, the second lens group G21, and the third lens group G31 are moved horizontally in a second optical axis direction DD2, camera shake compensation in a yaw direction YD may be performed. In FIG. 3, for convenience of explanation, the first lens group G11, the second lens group G21, and the third lens group G31 are indicated by L.

According to various embodiments, all lenses included in the optical lens assembly including the bending unit may be made of plastic. Furthermore, the optical lens assembly according to various embodiments may include at least one aspherical lens. For example, each of lenses included in the optical lens assembly according to various embodiments may be an aspherical lens.

According to various embodiments, at least one optical device OD1 may be provided between a seventh lens L7-1 and the image plane IMG. The optical device OD1 may include, for example, at least one of a low pass filter, an infrared (IR)-cut filter, or a cover glass. For example, when an IR-cut filter is provided as an optical device, visible rays are transmitted through to the image plane IMG and IR rays are blocked, thereby IR rays are prevented from being transmitted to the image plane IMG. However, the optical lens assembly may be configured without an optical device.

Figure 6:
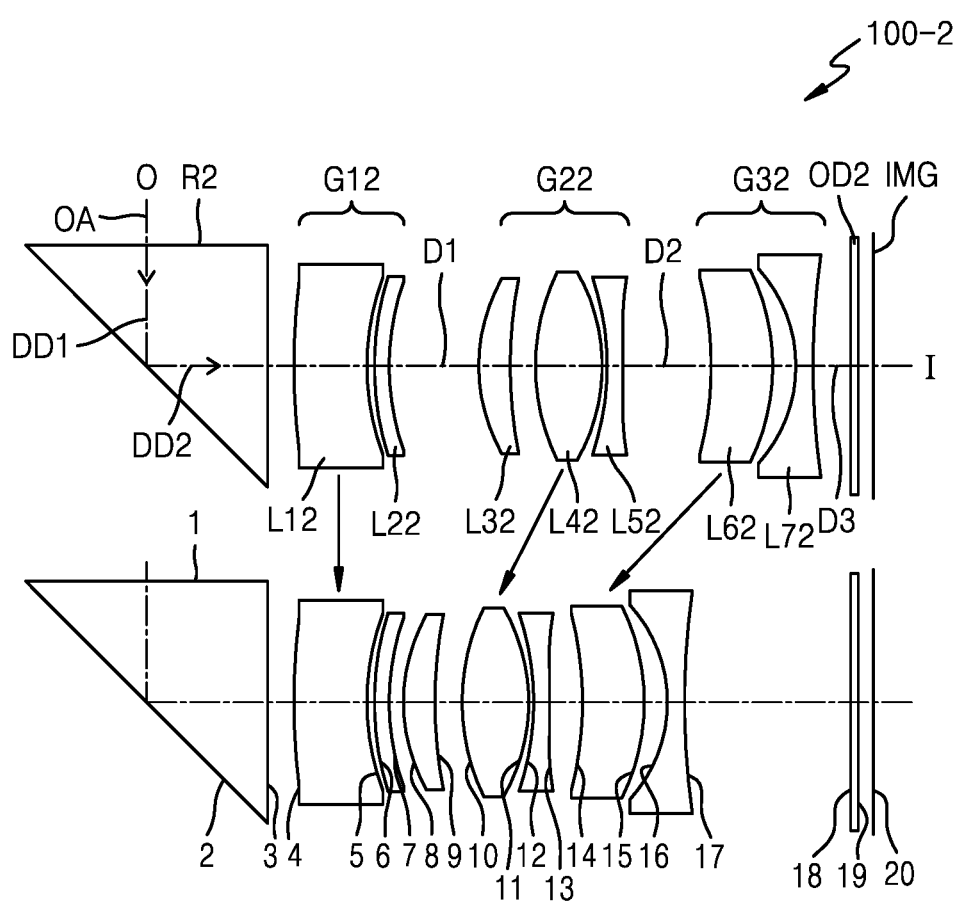
FIG. 6 illustrates an optical lens assembly according to a second numerical embodiment.

FIG. 6 illustrates an optical lens assembly 100-2 of a second numerical embodiment according to various embodiments. In relation to the optical lens assembly 100-2 according to the second numerical embodiment, detailed descriptions on the same parts of the optical lens assembly 100-1 of FIG. 1 are omitted.

The optical lens assembly 100-2 may include a bending unit R2 for changing the direction of the optical axis OA, a first lens group G12 having negative refractive power, a second lens group G22 having positive refractive power, and a third lens group G32 having negative refractive power, which are arranged from the object side O toward the image side I on the optical axis OA.

The first lens group G12 may include a first lens L12 having negative refractive power and a second lens L22 having positive refractive power, which are arranged in order from the object side O toward the image side I.

The second lens group G22 may include, for example, a third lens L32, a fourth lens L42 having positive refractive power, and a fifth lens L52 having negative refractive power.

The third lens group G32 may include, for example, a sixth lens L62 having positive refractive power and a seventh lens L72 having negative refractive power.

Figure 9:
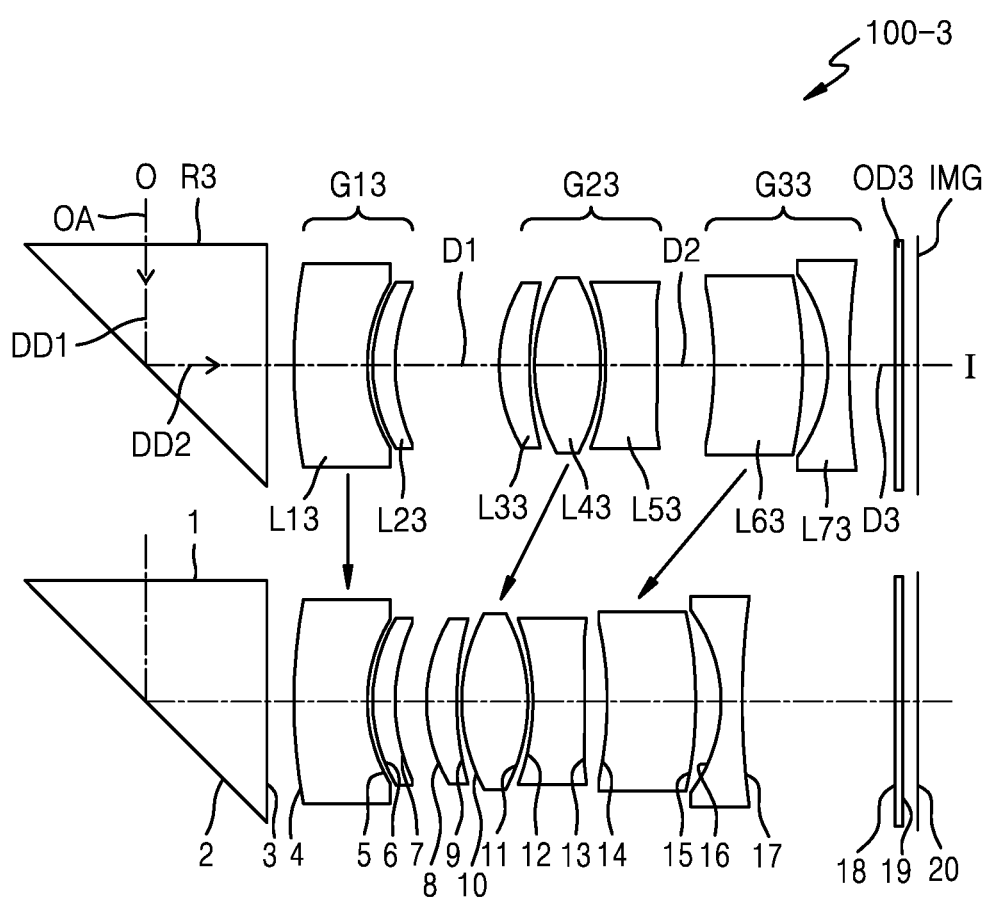
FIG. 9 illustrates an optical lens assembly according to a third numerical embodiment.

FIG. 9 illustrates an optical lens assembly 100-3 of a third numerical embodiment according to various embodiments. In relation to the optical lens assembly 100-3 according to the third numerical embodiment, detailed descriptions on the same parts of the optical lens assembly 100-1 of FIG. 1 are omitted.

The optical lens assembly 100-3 may include a bending unit R3 for changing the direction of the optical axis OA, a first lens group G13 having negative refractive power, a second lens group G23 having positive refractive power, and a third lens group G33 having negative refractive power, which are arranged from the object side O toward the image side I on the optical axis OA.

The first lens group G13 may include a first lens L13 having negative refractive power and a second lens L23 having positive refractive power, which are arranged in order from the object side O toward the image side I.

The second lens group G23 may include, for example, a third lens L33, a fourth lens L43 having positive refractive power, and a fifth lens L53 having negative refractive power.

The third lens group G33 may include, for example, a sixth lens L63 having positive refractive power and a seventh lens L73 having negative refractive power.

Figure 12:
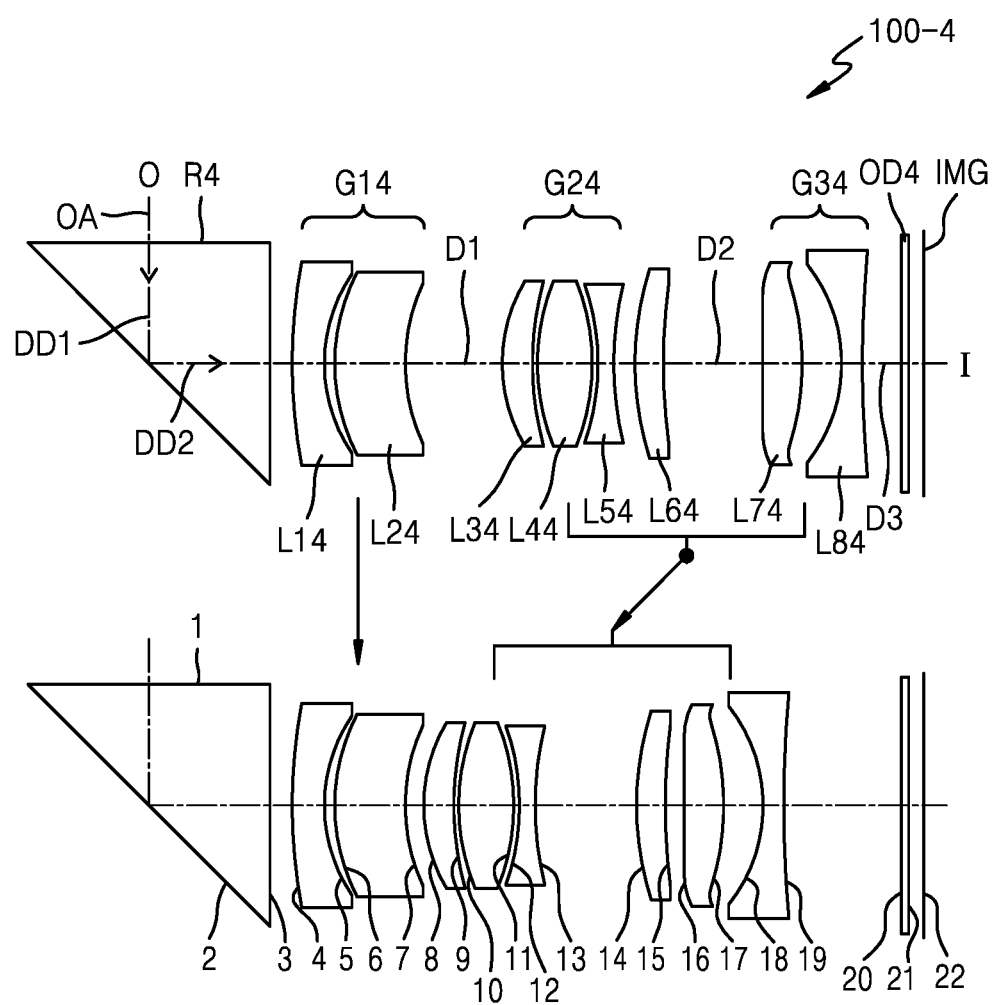
FIG. 12 illustrates an optical lens assembly according to a fourth numerical embodiment.

FIG. 12 illustrates an optical lens assembly 100-4 of a fourth numerical embodiment according to various embodiments. In relation to the optical lens assembly 100-4 according to the third numerical embodiment, detailed descriptions on the same parts of the optical lens assembly 100-1 of FIG. 1 are omitted.

The optical lens assembly 100-4 may include a bending unit R4 for changing the direction of the optical axis OA direction from the first direction DD1 to the second direction DD2, a first lens group G14 having negative refractive power, a second lens group G24 having positive refractive power, a sixth lens L64 having positive refractive power, and a third lens group G34 having negative refractive power, which are arranged in order from the object side O toward the image side I. During zooming from a wide angle position to a telephoto position, the second lens group G24 and the third lens group G34 are moved toward the object side O, while the sixth lens L64 may be fixed without movement.

The first lens group G14 may include a first lens L14 having negative refractive power and a second lens L24 having positive refractive power, which are arranged in order from the object side O toward the image side I.

The second lens group G24 may include, for example, a third lens L34, a fourth lens L44 having positive refractive power, and a fifth lens L54 having negative refractive power.

The third lens group G34 may include, for example, the sixth lens L64 having positive refractive power and a seventh lens L74 having negative refractive power.

In the present embodiment, during zooming from the wide angle position to the telephoto position, movement amounts of the second lens group G24 and the third lens group G34 may be the same. Since the movement amounts are the same, a driving source for moving the second lens group G24 and the third lens group G34 may be shared by the second lens group G24 and the third lens group G34. For example, by installing a link structure on the second lens group G24 and the third lens group G34, two lens groups may be moved by one driving source. In this case, when the zoom lens assembly module is formed, the mechanism for controlling zoom may be simplified.

The optical lens assembly according to various embodiments may satisfy the following inequalities. The following inequalities are described in the context of the optical lens assembly 100-1 according to the first numerical embodiment of FIG. 1. However, the same description may be applied to other embodiments.

$$Ld/D<0.85 \qquad \text{<Inequality 1>}$$

In Inequality 1, "Ld" denotes an effective diameter of a lens arranged closest to the image plane IMG at the wide angle position in the optical lens assembly, and "D" denotes a diameter of an image circle of the image sensor of the optical lens assembly.

The optical lens assembly according to various embodiments may satisfy the following inequality.

$$Lv/V<0.9 \qquad \text{<Inequality 2>}$$

In Inequality 2, "V" denotes a length of a short side of an image sensor at the wide angle position, and "Lv" denotes an effective diameter of light rays when the light rays pass through the lens arranged closest to the image plane IMG in the optical lens assembly and arrive at an end point of the short side of the image sensor at the wide angle position.

Inequality 1 and Inequality 2 are described in detail with reference to FIGS. 15 to 18.

The optical lens assembly according to various embodiments may be applied to a compact mobile electronic apparatus to obtain a high-resolution zoom image. For example, the optical lens assembly according to various embodiments may be mounted on electronic apparatuses with a wide-angle single focus camera in a dual module or a multi-module.

Figure 15:
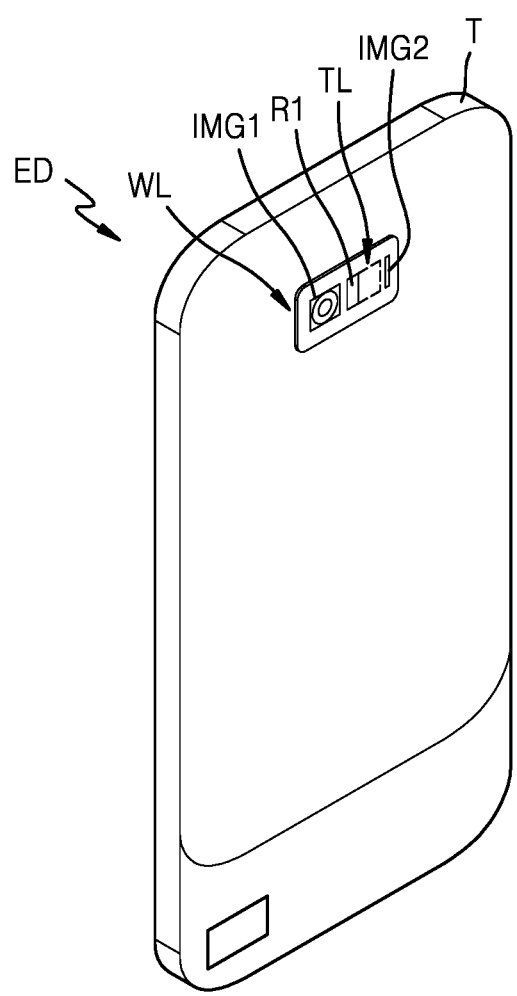
FIG. 15 illustrates an example of an electronic apparatus according to various embodiments.
Figure 16:
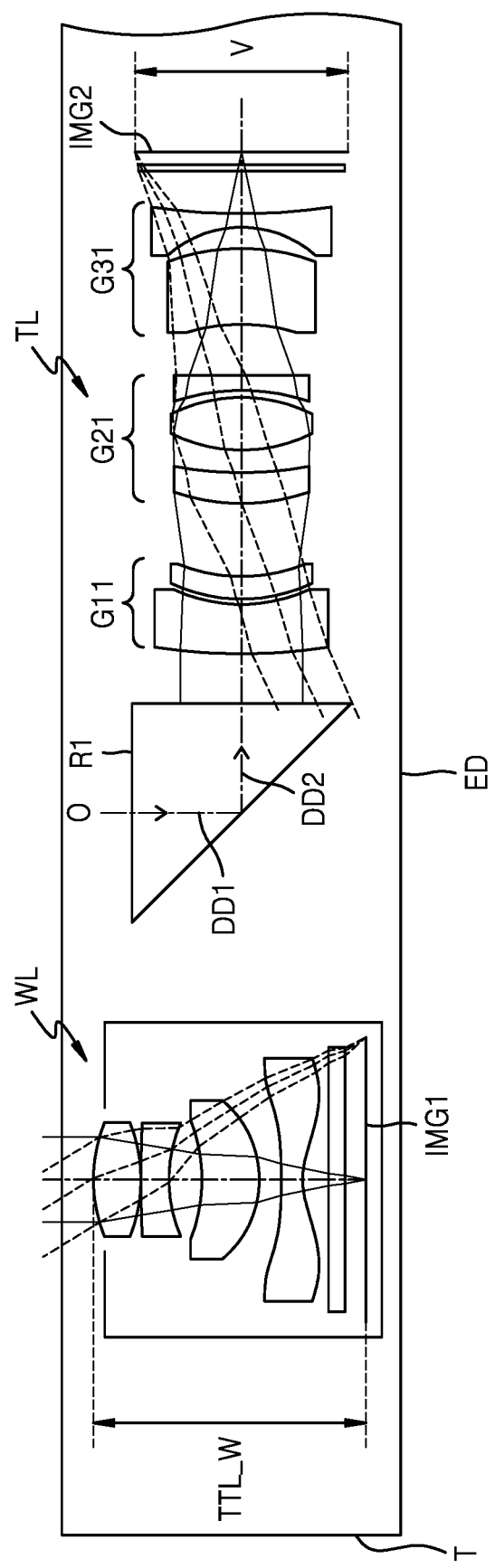
FIG. 16 is a layout diagram of two optical lens assemblies included in the electronic apparatus of FIG. 15.

FIG. 15 illustrates an electronic apparatus ED including a first optical lens assembly WL having a first field of view and a second optical lens assembly TL having a second field of view. The second field of view may be less than the first field of view. FIG. 16 is a plan view of FIG. 15, schematically illustrating the arrangement of optical lens assemblies in the electronic apparatus ED. The first optical lens assembly WL may be, for example, a wide-angle single-focus lens assembly. The second optical lens assembly TL may be the zoom lens assembly according to various embodiments. "T" denotes a thickness of the electronic apparatus ED. A first image sensor IMG1 capable of obtaining an image signal using light that passed through the first optical lens assembly WL may be provided. A second image sensor IMG2 capable of obtaining an image signal using light that passed through the second optical lens assembly TL may be provided.

The first optical lens assembly WL may have a zoom ratio of a first section according to the first field of view, and the second optical lens assembly TL may have a zoom ratio of a second section according to the second field of view. When a processor PS captures an image according to a zoom ratio of the second section, by using at least one of the first image sensor IMG1 or the second image sensor IMG2, the second lens group and the third lens group may be moved. For example, a zoom ratio of the first section may be a range of about 1 to 1.9 times, and a zoom ratio of the second section may be a range of about 2 to 3 times.

The lens configuration of the first optical lens assembly WL and the second optical lens assembly TL illustrated in FIG. 16 is exemplary, and the present disclosure is not limited thereto. The example illustrated in FIG. 1 is used as the second optical lens assembly TL of FIG. 16. According to various embodiments, in the second optical lens assembly TL, the optical axis direction may be changed by the bending unit R1 from the first direction DD1 to the second direction DD2. Lenses of the first optical lens assembly WL may be arranged, for example, in a direction parallel to the first direction DD1. For example, the first direction DD1 may be parallel to the transverse direction of the electronic apparatus ED (i.e. the direction in which the thickness T is measured), and the second direction DD2 may be orthogonal to the transverse direction.

In FIG. 16, "TTL_W" denotes a total length of the first optical lens assembly WL, and the total length denotes a distance from an object side surface of a lens arranged closest to the object side O along the optical axis to the first image sensor IMG1.

Figure 17:
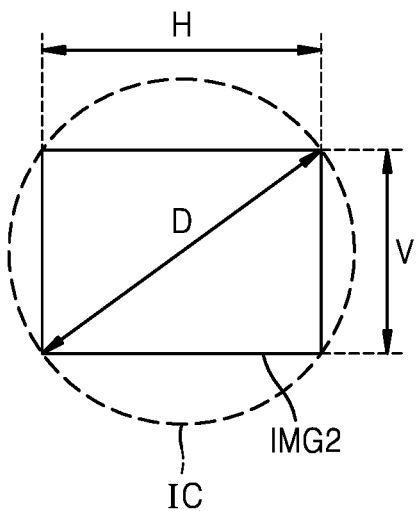
FIG. 17 illustrates an image circle of an optical lens assembly according to various embodiments.

FIG. 17 illustrates the second image sensor IMG2 of the second optical lens assembly TL and an image circle IC. The image circle IC may be a circle having a diameter equivalent to a diagonal length of the second image sensor IMG2. "D" denotes a diameter of the image circle IC or a diagonal length of the second image sensor IMG2. In general, an image height is half of the diagonal length of an image sensor. "V" denotes a length of a short side of the second image sensor IMG2, and "H" denotes a length of a long side thereof.

Figure 18:
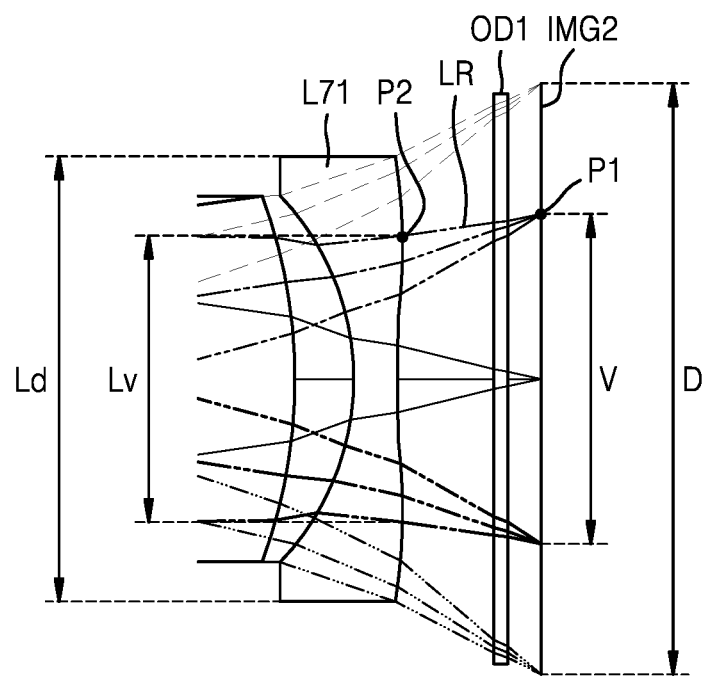
FIG. 18 is a view for explaining an effective diameter and a short-side effective diameter of an optical lens assembly according to various embodiments.

FIG. 18 is a partially enlarged view of the second optical lens assembly TL, in which the seventh lens L71 arranged closest to the image side, the optical device OD1, and the second image sensor IMG2 are illustrated. "Ld" denotes an effective diameter of the seventh lens L71 arranged closest to the image side at the wide angle position. "Lv" denotes an effective diameter of light rays LR at the point P2 where the light rays LR passes through the lens arranged closest to the image plane IMG (the seventh lens L71), where the light ray LR arrive at the short side end point P1 of the second image sensor at the wide angle position. The Lv is referred to as the short-side effective diameter. Inequality 1 relates to the ratio between the effective diameter of the seventh lens L71 at the wide angle position and the diameter of the image circle. When Inequality 1 is satisfied, the size of the seventh lens L71 is configured to be less than that of the image sensor assembly, and thus the optical lens assembly may be miniaturized.

Inequality 2 relates to the ratio between the short side length and the short-side effective diameter of the second image sensor at the wide angle position. When Inequality 2 is satisfied, the second image sensor is formed such that the short-side effective diameter is less than the short side height of the image sensor, and thus the optical lens assembly may be miniaturized.

In various embodiments, during zooming from the wide angle position to the telephoto position, the second lens group G21 and the third lens group G31 may be moved in the object side O direction. According to various embodiments, the effective diameter of each lens of each lens group may be less than a diameter D of the image circle.

When the seventh lens L71 of the third lens group G31, which is arranged closest to the image side, has a concave shape toward the object side O and has negative refractive power, and when the effective diameter thereof is less than the diameter of the image circle, chromatic aberration in the overall area from the wide angle position to the telephoto position may be reduced. Astigmatism and astigmatic field curves occurring during zooming may be efficiently reduced.

When a solid state imaging device is used as the image sensor, the size of the image circle may be determined by the diagonal length of an effective pixel area of the solid state imaging device. For example, in Table 1 according to the first numerical embodiment, the effective diameter of each lens may be less than the diameter of the image circle.

According to various embodiments, the second optical lens assembly TL may be configured with an optical zoom lens having a telephoto field of view and a variable focal length. Referring to FIG. 16, according to various embodiments, the thickness of the second optical lens assembly TL (corresponding to the short side length V of the second image sensor IMG2) is less than the height of the first optical lens assembly WL (corresponding to the total length TTL_W) such that the second optical lens assembly TL and a wide-angle single-focus camera lens may be mounted on a compact mobile electronic apparatus ED.

For example, the compact mobile electronic apparatus ED may have a thin design having a thickness ranging from several millimeters to 10 mm or less. The height (or thickness) of a camera module mounted on the electronic apparatus ED may be less than the thickness of the electronic apparatus ED. For example, when an optical path length (total length) of the wide-angle camera module is about 5 mm to about 6 mm, the wide-angle camera module may be mounted on the electronic apparatus ED while maintaining the design of the compact mobile electronic apparatus.

These constraints may be applied to a high-resolution zoom image capturing device. An optical path length of a wide-angle single-focus camera module (first optical lens assembly) having the largest field of view among camera lenses mounted on a dual module or a multi-module may be about 5 mm to about 6 mm. Furthermore, the height of an optical zoom lens module (second optical lens assembly) having a variable focal length may be less than the height or optical path length of the wide-angle camera module. Factors for determining the thickness of a compact optical zoom lens assembly may include the height of a bending unit, the effective diameter of each lens, the size of an image circle, and the short side length of an image sensor.

When the effective diameter of each lens is reduced and the size of the image circle (or image sensor size) is reduced, the height of a zoom lens assembly may be deceased, but the brightness of a lens may be reduced. Furthermore, when the size of an image sensor is small, an effective resolution decreases, and thus the specifications and image quality of a camera may be deteriorated.

In order to increase the specifications of an optical zoom lens assembly, to increase the image quality, and to decrease the size of a camera module, the short side length of an image sensor of the zoom lens assembly may be configured to be the same as or slightly less than the height of a wide-angle optical lens assembly. To this end, while the size of the image circle of the optical zoom lens assembly is obtained as large as possible, and a bright Fno is maintained, the effective diameter of each lens forming the zoom lens assembly may be less than the diameter of the image circle. When the zoom lens assembly is configured as above, the thickness of the zoom lens assembly may be configured to be the same as or less than the height of the wide-angle optical lens assembly.

To decrease the thickness of the compact optical zoom lens assembly, the height of a portion where the bending unit is disposed may be decreased, and the effective diameter of each lens may be less than the diameter of the image circle (the diagonal length of the image sensor). The short-side effective diameter may be the same as or less than the short side length of the image sensor. When the zoom lens assembly module is formed as above, the height of the zoom lens assembly module may be configured to be the same as or less than the short side length of the sensor module. In the sensor module, the image sensor may be packaged with a PCB, and the sensor module may be a module including a minimum number of parts needed when attached to the module.

Furthermore, according to various embodiments, the overall optical path length of the optical lens assembly may be less than or equal to about 17 mm. Referring to FIG. 1, the overall optical path length of the optical lens assembly denotes the sum of a distance ttla from an incident surface IS of the bending unit R1 to a reflective surface RS of the bending unit R1 and a distance ttlb from the reflective surface RS of the bending unit R1 to the image plane IMG.

According to various embodiments, when the overall optical path length of the first optical lens assembly WL at the wide angle position is TTL_W, and the size of the short side of the image sensor in the image circle at an image side of the second optical lens assembly TL is V, V/TTL_W<1 may be satisfied.

Figure 19:
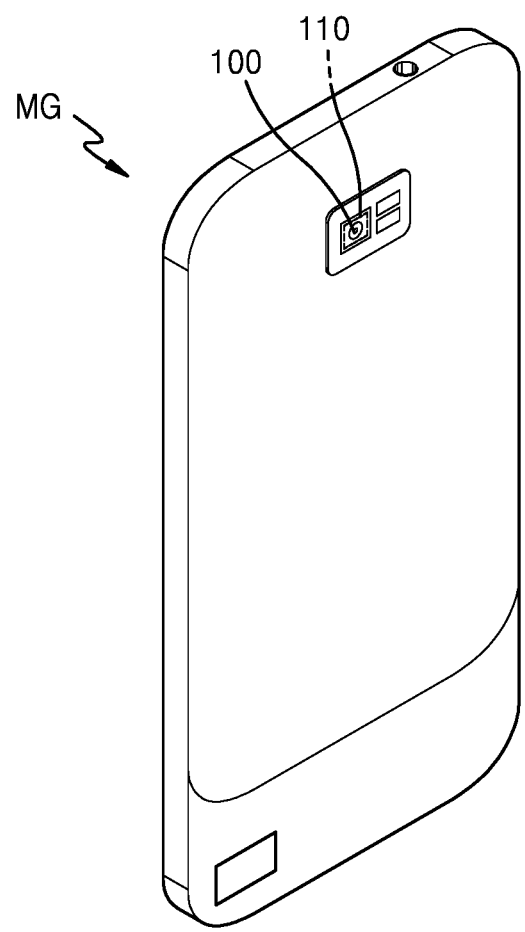
FIG. 19 illustrates another example of an electronic apparatus according to various embodiments.

Next, FIG. 19 illustrates an example of an electronic apparatus MG having an optical lens assembly according to various embodiments. In FIG. 19, an example in which the electronic apparatus MG is a mobile phone is illustrated, but the present disclosure is not limited thereto. The electronic apparatus MG may include at least one optical lens assembly 100 and an image sensor 110 that receives an image formed by the optical lens assembly 100 and converts the received image to an electric image signal. The optical lens assemblies described with reference to FIGS. 1 to 14 may be employed as the optical lens assembly 100. As the optical lens assembly according to various embodiments is applied to an electric device such as a compact mobile phone, a high-performance imaging apparatus capable of capturing an image may be implemented.

An aspherical surface used for the optical lens assembly according to various embodiments is defined as follows.

An aspherical shape may be expressed by the following equation based on that the optical axis direction is set to be an x axis, a vertical direction to the optical axis direction is set to be a y axis, and a direction in which a light ray proceeds is set to be a forward direction. In the equation, "x" denotes a distance from a vertex of a lens in the optical axis direction, "y" denotes a distance in a vertical direction to the optical axis, "K" denotes a Conic constant, "A, B, C, D . . . " denote aspherical coefficients, and "c" denotes a reciprocal (1/R) of a radius of curvature at a vertex of a lens.

$$x = \frac{cy^2}{1 + \sqrt{1 - (K+1)c^2 y^2}} + Ay^4 + By^6 + Cy^8 + Dy^{10} + \ldots \quad \text{<Inequality 3>}$$

In the present disclosure, an optical lens assembly may be implemented through a numerical embodiment according to various designs as follows.

In each numerical embodiment, lens surface numbers (1, 2, 3, . . . , n; n is a natural number) are sequentially allotted in series from the object side O toward the image side I. "R" denotes a radius of curvature. "Dn" denotes a thickness of a lens or an air interval between lenses. "Nd" denotes a refractive index. "Vd" denotes an Abbe number. "Asphere" denotes an aspherical surface. "Sphere" denotes a spherical surface.

First Numerical Embodiment

FIG. 1 illustrates the optical lens assembly 100-1 of the first numerical embodiment according to various embodiments. Table 1 shows, for example, design data of the first numerical embodiment.

TABLE 1

| Lens Surface | Lens Surface Type | R | Dn | Nd | Vd | Effective Diameter | Short-Side Effective Diameter |
|---|---|---|---|---|---|---|---|
| 1 |  | Infinity | 2.3 | 1.84666 | 23.8 |  |  |
| 2 | Reflect | Infinity | 2.3 | 1.84666 | 23.8 |  |  |
| 3 |  | Infinity | 0.9 |  |  |  |  |
| 4 | Asphere | 8.692673 | 1.094 | 1.53113 | 55.7 | 3.93 | 3.23 |
| 5 | Asphere | 3.397049 | 0.128 |  |  | 3.14 | 3.14 |
| 6 | Asphere | 3.41252 | 0.496 | 1.65038 | 21.5 | 3.15 | 3.06 |
| 7 | Asphere | 3.552995 | D1 |  |  | 3.07 | 3.02 |
| 8 | Asphere | 3.605894 | 0.67 | 1.5441 | 56.1 | 3.10 | 3.10 |
| 9 | Asphere | 7.181353 | 0.562 |  |  | 3.08 | 3.08 |
| 10 | Asphere | 3.303345 | 1.257 | 1.53113 | 55.7 | 3.20 | 3.20 |
| 11 | Asphere | −2.858481 | 0.1 |  |  | 3.20 | 3.15 |
| 12 | Asphere | −4.15125 | 0.3 | 1.65038 | 21.5 | 3.07 | 2.97 |
| 13 | Asphere | −26.185372 | D2 |  |  | 3.01 | 2.85 |
| 14 | Asphere | −5.86396 | 1.7 | 1.65038 | 21.5 | 3.13 | 2.69 |
| 15 | Asphere | −3.94891 | 0.54 |  |  | 3.37 | 2.71 |
| 16 | Asphere | −3.726114 | 0.4 | 1.5441 | 56.1 | 3.40 | 2.59 |
| 17 | Asphere | 5.322236 | D3 |  |  | 4.13 | 2.79 |
| 18 | Sphere | Infinity | 0.11 | 1.5168 | 64.2 | 5.17 | 3.16 |
| 19 | Sphere | Infinity | 0.3 |  |  | 5.22 | 3.17 |
| 20 | IMG | Infinity |  |  |  | 5.40 | 3.24 |

Table 2 shows aspherical coefficients in the first numerical embodiment.

TABLE 2

| Lens Surface | K | A | B | C | D | E | F |
|---|---|---|---|---|---|---|---|
| 4 | 5.553945 | −4.3788E−03 | −7.1513E−04 | 7.8691E−05 | −5.5701E−06 | 0 | 0 |
| 5 | −0.205114 | 1.7234E−03 | −2.7969E−03 | −8.0457E−04 | 2.5790E−04 | 2.5068E−06 | 0 |
| 6 | −0.641524 | −3.9951E−03 | −2.0865E−03 | −1.2739E−04 | −1.0274E−04 | 6.7211E−05 | 0 |
| 7 | 1.776865 | −1.9596E−02 | −5.0727E−04 | −1.5334E−04 | −1.1596E−04 | 3.9873E−05 | 0 |
| 8 | −3.357748 | −8.1376E−04 | −2.8136E−04 | −2.9155E−04 | 3.1961E−04 | −1.1487E−04 | 0 |
| 9 | −15 | −7.0280E−03 | 1.9504E−03 | 4.7502E−04 | 6.6487E−05 | −1.0724E−04 | 0 |
| 10 | −1.261364 | −2.3362E−03 | 2.6531E−03 | 1.8005E−04 | 2.7851E−05 | −4.0031E−05 | 0 |
| 11 | −2.932716 | −9.8375E−04 | −1.2101E−03 | 4.1574E−04 | 1.0682E−04 | −3.5782E−05 | 0 |
| 12 | −1.612822 | −2.1367E−04 | 1.2417E−03 | −1.3210E−04 | 1.6726E−04 | 1.0121E−05 | 0 |
| 13 | 67.916507 | 3.0078E−03 | 1.7874E−03 | 1.4450E−03 | −3.9190E−04 | 1.2018E−04 | 7.6566E−17 |
| 14 | −5.854572 | 9.3923E−03 | −3.6840E−03 | 2.1258E−03 | −4.3144E−04 | 2.4235E−05 | 0 |
| 15 | −13.991483 | −1.0332E−02 | 1.2153E−03 | 8.1014E−04 | −2.6973E−04 | 6.4438E−05 | 0 |
| 16 | 2.415394 | −5.7940E−02 | 1.8814E−02 | −3.4152E−03 | 6.0526E−04 | 3.7344E−15 | 0 |
| 17 | −44.269463 | −4.1110E−02 | 1.5492E−02 | −3.7666E−03 | 5.8108E−04 | −4.0801E−05 | 0 |

Table 3 shows variable distances D1, D2, and D3, a focal length, and F-number at the wide angle position and the telephoto position in the first numerical embodiment.

TABLE 3

|    | Wide Angle End | Telephoto End |
|----|----------------|---------------|
| D1 | 1.701 | 0.300 |
| D2 | 1.185 | 0.486 |
| D3 | 0.900 | 2.998 |
| focal length | 6 | 9 |
| Fno | 2.1 | 2.8 |

In an electronic apparatus having a dual module type camera module that includes the wide-angle optical lens assembly and the zoom optical lens assembly according to various embodiments, when an optical path length of the wide-angle optical lens assembly is about 5 mm, like the configuration of the first numerical embodiment, the diameter of the image circle is 5.4 mm or less, and the short side length V of the image circle is about 3.24 mm or less. Accordingly, the height of the short side of the image sensor of the zoom optical lens assembly according to various embodiments may be less than the length of an optical path of the wide-angle optical lens assembly. To make the thickness of the optical lens assembly according to various embodiments less than the short side height of the image sensor, the effective diameter of each lens included in the optical lens assembly may be less than 5.4 mm that is the diameter of the image circle of the image sensor. Accordingly, the short-side effective diameter may be miniaturized, and the Fno may be decreased, thereby improving low-resolution image quality.

In the present embodiment, the optical lens assembly may be mounted on a compact mobile device in a configuration such that the ratio between the effective diameter Ld of the lens closest to the image side at the wide angle position and the diameter D of the image circle is about 0.764 and the total length of the optical path is shorter than 17 mm.

Figure 4:
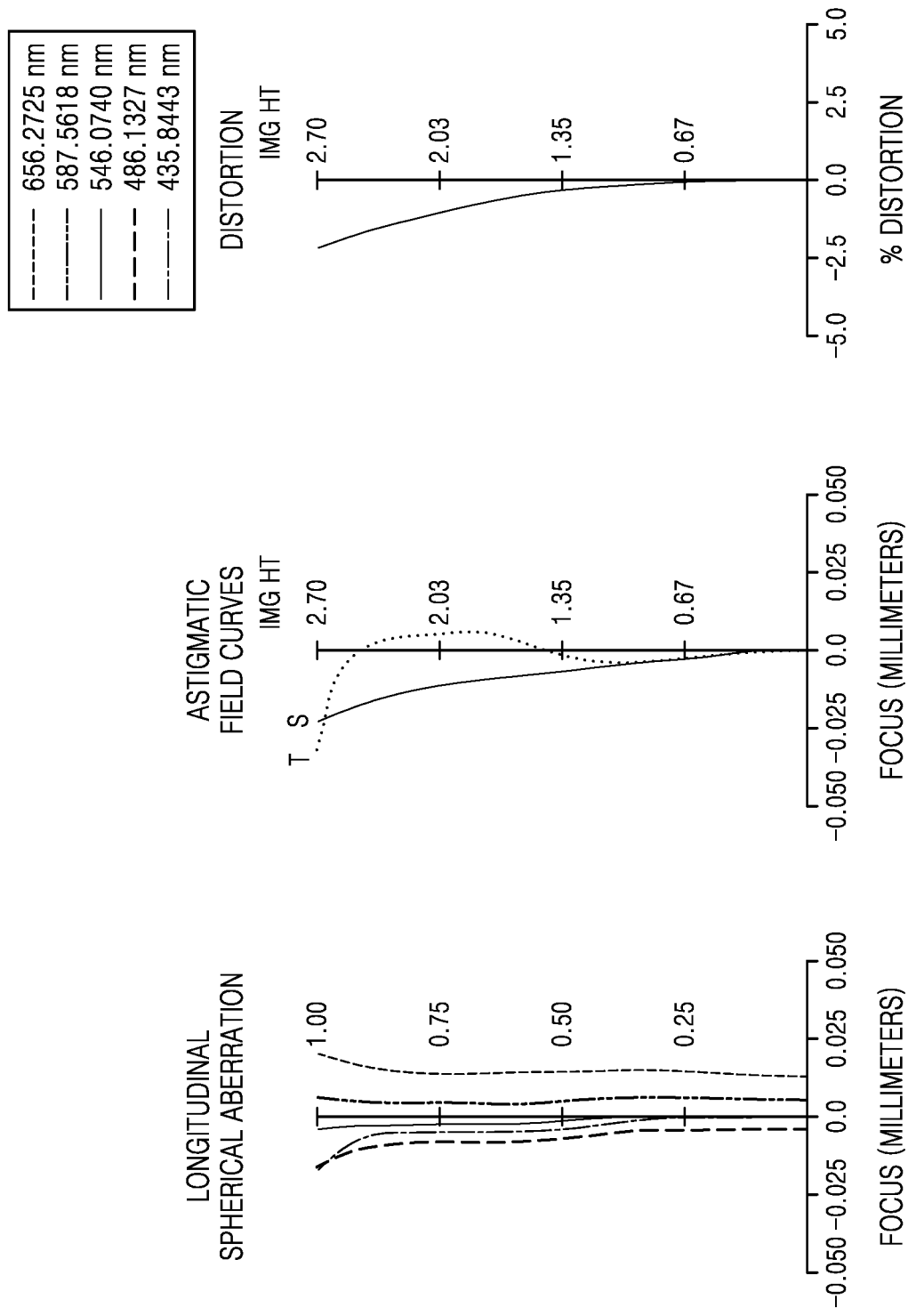
FIG. 4 is an aberration diagram at a wide angle position of the optical lens assembly of the first numerical embodiment according to various embodiments.
Figure 5:
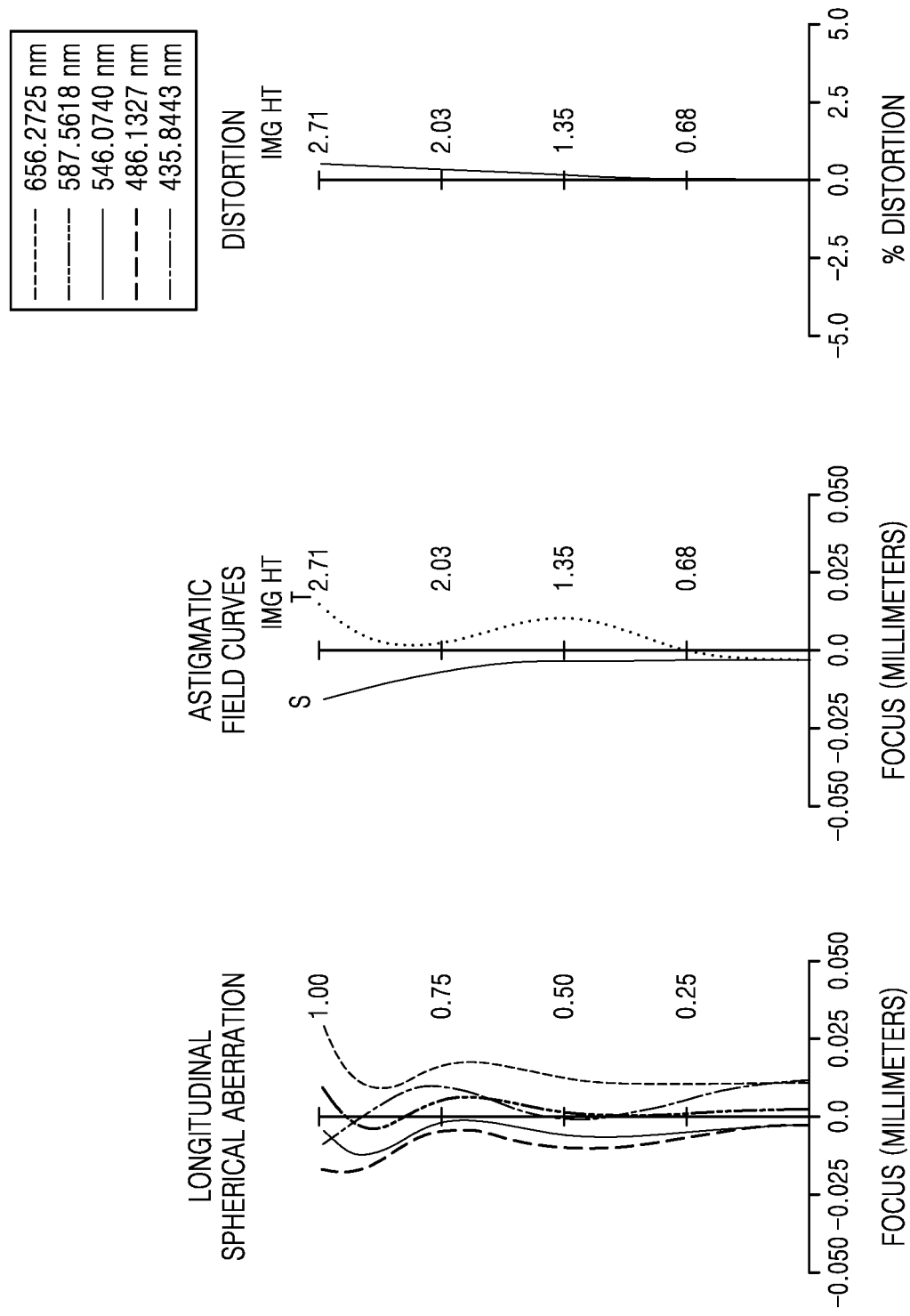
FIG. 5 is an aberration diagram at a telephoto position of the optical lens assembly of the first numerical embodiment according to various embodiments.

FIG. 4 illustrates longitudinal spherical aberration, astigmatic field curves, and distortion of the optical lens assembly 100-1 at the wide angle position, according to the first numerical embodiment of the present disclosure. FIG. 5 illustrates longitudinal spherical aberration, astigmatic field curves, and distortion of the optical lens assembly 100-1 at the telephoto position, according to the first numerical embodiment of the present disclosure. The longitudinal spherical aberration may be generated with respect to, for example, each of light rays having wavelengths of 656.2725 nm, 587.5618 nm, 546.0740 nm, 486.1327 nm, and 435.8443 nm, in which a tangential field curvature T and a sagittal field curvature S are shown as the astigmatic field curves. The astigmatic field curves may be generated with respect to a light ray having a wavelength of 587.5618 nm, and the distortion may be generated with respect to a light ray having a wavelength of 587.5618 nm.

Second Numerical Embodiment

FIG. 6 illustrates the optical lens assembly 100-2 of the second numerical embodiment according to various embodiments. Table 4 shows, for example, design data of the second numerical embodiment.

TABLE 4

| Lens Surface | Lens Surface Type | R | Dn | Nd | Vd | Effective Diameter | Short-Side Effective Diameter |
|---|---|---|---|---|---|---|---|
| 1 |  | 1.00E+18 | 1.88 | 1.84666 | 23.8 |  |  |
| 2 | Reflect | 1.00E+18 | 1.88 | 1.84666 | 23.8 |  |  |
| 3 |  | 1.00E+18 | 0.4 |  |  |  |  |
| 4 | Asphere | 8.307707 | 1.134 | 1.53113 | 55.7 | 3.10 | 3.10 |
| 5 | Asphere | 3.406615 | 0.081 |  |  | 2.68 | 2.49 |
| 6 | Asphere | 4.159660 | 0.260 | 1.65038 | 21.5 | 2.67 | 2.50 |
| 7 | Asphere | 4.246454 | D1 |  |  | 2.60 | 2.48 |
| 8 | Asphere | 2.290767 | 0.483 | 1.5441 | 56.1 | 2.56 | 2.56 |
| 9 | Asphere | 4.732494 | 0.419 |  |  | 2.61 | 2.57 |
| 10 | Asphere | 3.123345 | 1.016 | 1.53113 | 55.7 | 2.94 | 2.73 |
| 11 | Asphere | −2.543425 | 0.081 |  |  | 2.93 | 2.67 |
| 12 | Asphere | −3.679981 | 0.244 | 1.65038 | 21.5 | 2.76 | 2.50 |
| 13 | Asphere | 190.121085 | D2 |  |  | 2.69 | 2.41 |
| 14 | Asphere | −4.062696 | 0.955 | 1.65038 | 21.5 | 2.83 | 2.24 |
| 15 | Asphere | −2.540155 | 0.355 |  |  | 3.08 | 2.30 |
| 16 | Asphere | −3.030067 | 0.326 | 1.5441 | 56.1 | 3.09 | 2.20 |
| 17 | Asphere | 3.820938 | D3 |  |  | 3.66 | 2.34 |
| 18 | Sphere | 1.00E+18 | 0.110 | 1.5168 | 64.2 | 4.22 | 2.58 |
| 19 | Sphere | 1.00E+18 | 0.231 |  |  | 4.26 | 2.59 |
| 20 | Image | 1.00E+18 | 0.000 |  |  | 4.40 | 2.64 |

Table 5 shows aspherical coefficients in the second numerical embodiment.

TABLE 5

| Lens Surface | K | A | B | C | D | E |
|---|---|---|---|---|---|---|
| 4 | −2.6390E+00 | −1.1023E−02 | −2.1566E−04 | −4.4985E−05 | 8.3423E−05 | −1.6687E−05 |
| 5 | −2.6299E+00 | −7.5986E−03 | −1.3357E−03 | −5.6055E−04 | 4.4637E−04 | −6.3663E−05 |

TABLE 5-continued

| Lens Surface | K | A | B | C | D | E |
|---|---|---|---|---|---|---|
| 6 | 1.1666E+00 | 3.1203E−03 | −2.0710E−03 | −1.0240E−03 | −9.1155E−05 | 4.8517E−05 |
| 7 | 5.2604E+00 | −4.9381E−03 | −3.2292E−03 | −5.8419E−04 | −6.3994E−04 | 3.4461E−05 |
| 8 | −1.6707E+00 | 2.9799E−03 | 1.7345E−04 | −5.3359E−04 | 6.7450E−04 | −2.9326E−04 |
| 9 | −9.9320E+00 | −5.9054E−03 | 9.6964E−04 | 1.3530E−03 | −1.3212E−05 | −8.8807E−05 |
| 10 | −1.7789E+00 | −3.1018E−03 | 2.2610E−03 | 5.5183E−04 | −1.1821E−04 | 5.8382E−06 |
| 11 | −4.3940E+00 | −2.7771E−04 | −5.3585E−03 | 1.1159E−03 | −2.6700E−04 | 4.6588E−05 |
| 12 | −3.7162E+00 | −1.5701E−04 | 3.1918E−03 | −3.0005E−03 | 5.2895E−04 | 2.7195E−05 |
| 13 | −7.0000E+01 | 6.5368E−03 | 7.3009E−03 | 2.3133E−03 | −2.8849E−03 | 8.1935E−04 |
| 14 | −5.0265E+00 | 2.5538E−02 | −1.7578E−02 | 9.1071E−03 | −1.9096E−03 | −1.9649E−04 |
| 15 | −7.2998E+00 | −4.0581E−03 | −1.3496E−02 | 7.4074E−03 | −3.9304E−05 | −3.0802E−04 |
| 16 | 8.8447E−01 | −1.0046E−01 | 3.1974E−02 | 3.2473E−04 | −5.7071E−04 | 0.0000E+00 |
| 17 | −3.2053E+01 | −7.3073E−02 | 4.2620E−02 | −1.2305E−02 | 1.8949E−03 | −1.2775E−04 |

Table 6 shows variable distances D1, D2, and D3, a focal length, and F-number at the wide angle position and the telephoto position in the second numerical embodiment.

TABLE 6

| | Wide Angle End | Telephoto End |
|---|---|---|
| D1 | 1.368 | 0.245 |
| D2 | 1.358 | 0.538 |
| D3 | 0.530 | 2.471 |
| focal length | 4.90 | 7.34 |
| Fno | 2.09 | 2.88 |

For example, in the second numerical embodiment, when the length of an optical path of the wide-angle optical lens assembly is about 4 mm, the size of the image circle is Φ4.4 or less and the short side length of the image circle is about 2.64 mm or less. Accordingly, the height of the short side of the image sensor according to the second numerical embodiment may be configured to be less than the length of the optical path of the wide-angle optical lens assembly.

In the present embodiment, the optical lens assembly may be mounted on a compact mobile device in a configuration such that the ratio between the effective diameter Ld of the lens closest to the image side at the wide angle position and the diameter D of the image circle is about 0.83 and the total length of the optical path is about 13 mm.

Figure 7:
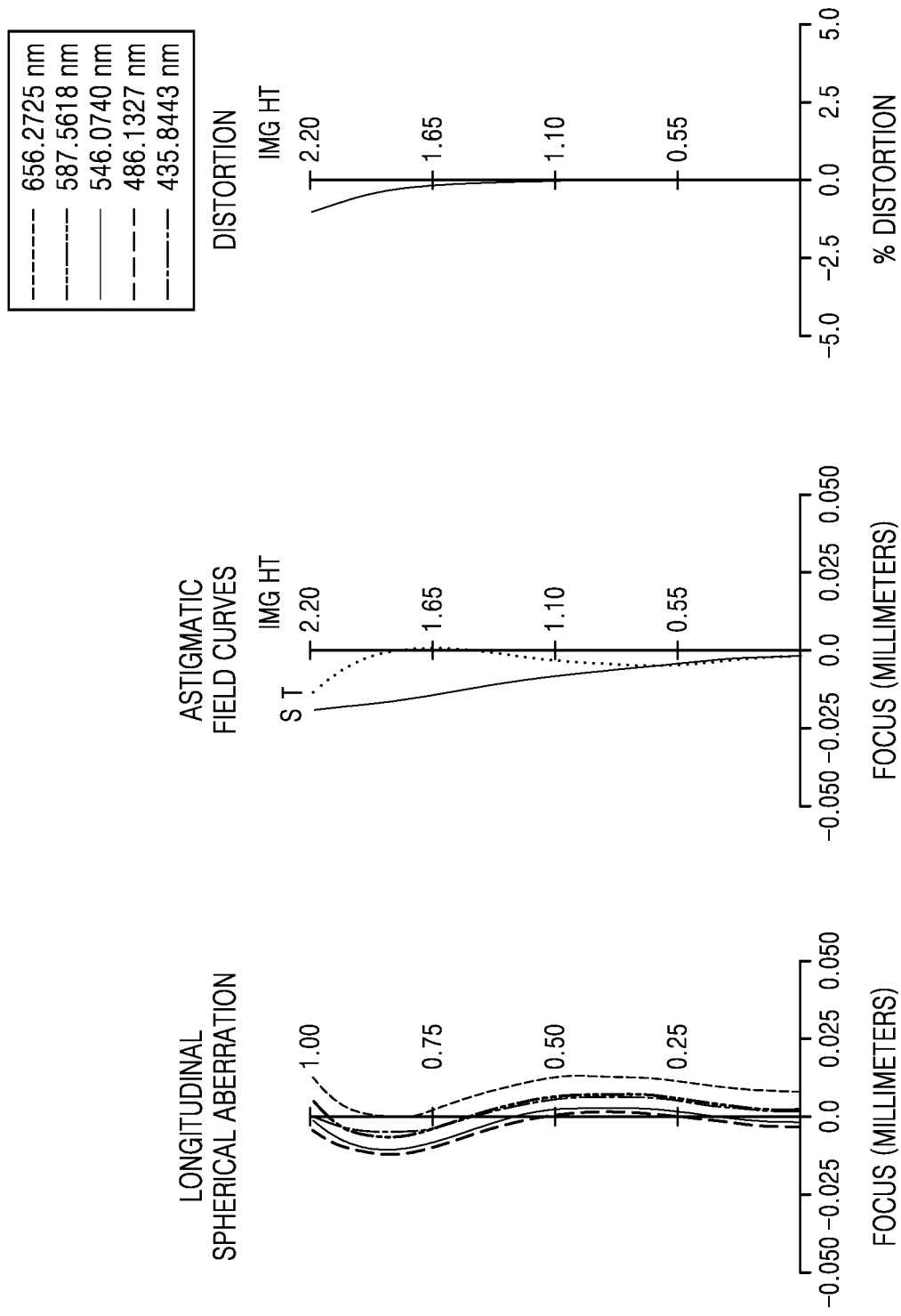
FIG. 7 is an aberration diagram at a wide angle position of the optical lens assembly of the second numerical embodiment according to various embodiments.

FIG. 7 illustrates longitudinal spherical aberration, astigmatic field curves, and distortion of the optical lens assembly 100-2 at the wide angle position, according to the second numerical embodiment of the present disclosure.

Figure 8:
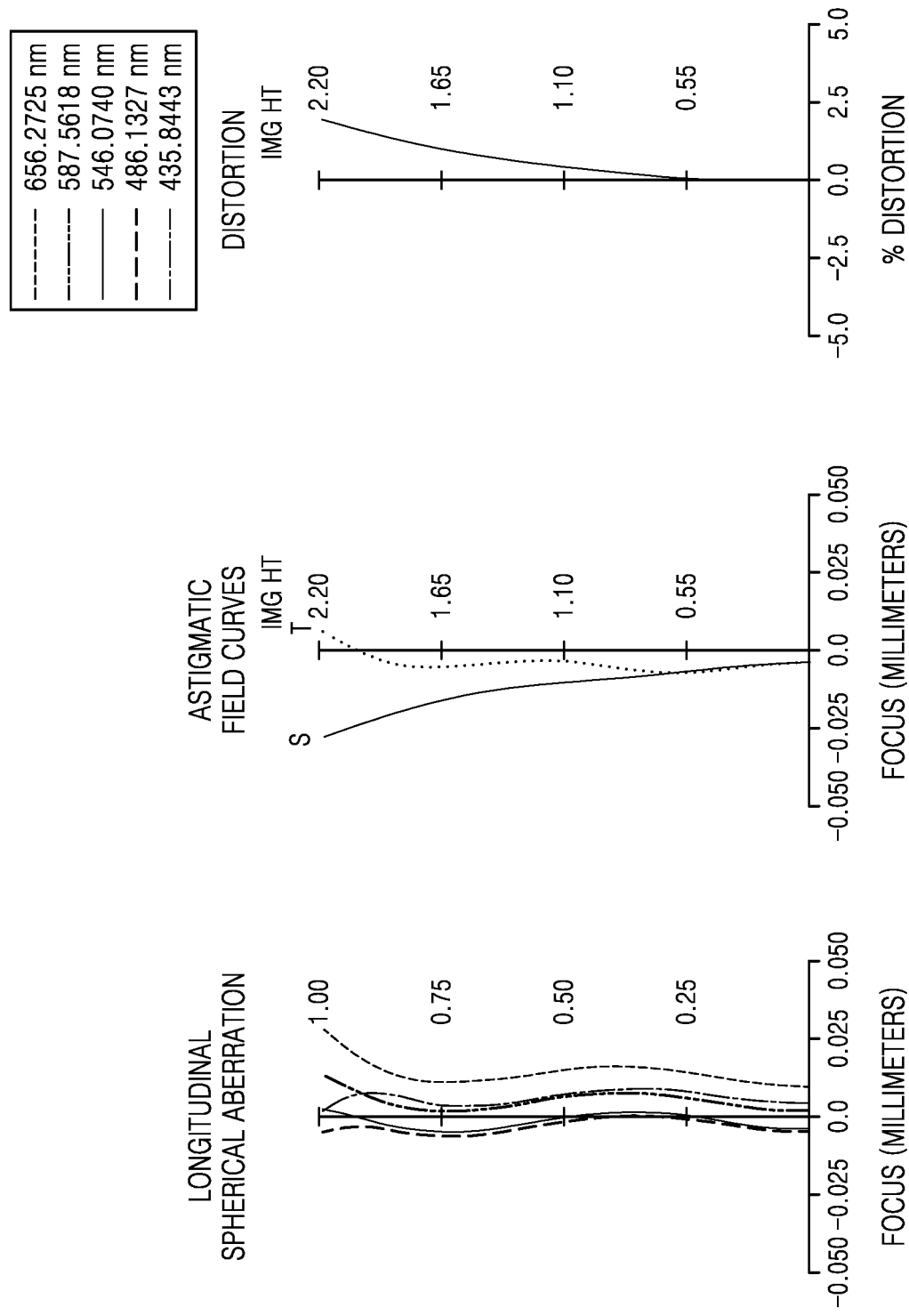
FIG. 8 is an aberration diagram at a telephoto position of the optical lens assembly of the second numerical embodiment according to various embodiments.

FIG. 8 illustrates longitudinal spherical aberration, astigmatic field curves, and distortion of the optical lens assembly 100-2 at the telephoto position, according to the second numerical embodiment of the present disclosure.

Third Numerical Embodiment

FIG. 9 illustrates the optical lens assembly 100-3 of the third numerical embodiment according to various embodiments. Table 7 shows, for example, design data of the third numerical embodiment.

TABLE 7

| Lens Surface | Lens Surface Type | R | Dn | Nd | Vd | Effective Diameter | Short-Side Effective Diameter |
|---|---|---|---|---|---|---|---|
| 1 | | infinity | 2.3 | 1.65038 | 21.5 | | |
| 2 | Reflect | infinity | 2.3 | 1.65038 | 21.5 | | |
| 3 | | infinity | | | | | |
| 4 | Asphere | 7.209334 | 1.385 | 1.5441 | 56.1 | 3.90 | 3.20 |
| 5 | Asphere | 2.780967 | 0.100 | | | 3.26 | 2.99 |
| 6 | Asphere | 2.910931 | 0.406 | 1.65038 | 21.5 | 3.25 | 3.02 |
| 7 | Asphere | 3.206065 | D1 | | | 3.11 | 2.96 |
| 8 | Asphere | 3.103154 | 0.560 | 1.5441 | 56.1 | 3.10 | 3.10 |
| 9 | Asphere | 7.145617 | 0.100 | | | 3.16 | 3.11 |
| 10 | Asphere | 3.437087 | 1.228 | 1.53113 | 55.7 | 3.34 | 3.21 |
| 11 | Asphere | −3.152462 | 0.100 | | | 3.34 | 3.16 |
| 12 | Asphere | −3.417047 | 0.991 | 1.65038 | 21.5 | 3.21 | 3.01 |
| 13 | Asphere | −10.985895 | D2 | | | 3.07 | 2.77 |
| 14 | Asphere | −5.809901 | 1.700 | 1.65038 | 21.5 | 3.19 | 2.61 |
| 15 | Asphere | −4.398516 | 0.462 | | | 3.47 | 2.62 |
| 16 | Asphere | −5.923227 | 0.499 | 1.5441 | 56.1 | 3.50 | 2.53 |
| 17 | Asphere | 4.117782 | D3 | | | 4.13 | 2.64 |
| 18 | Sphere | infinity | 0.110 | 1.5168 | 64.2 | 4.70 | 2.89 |
| 19 | Sphere | infinity | 0.300 | | | 4.76 | 2.91 |
| 20 | Image | infinity | 0.000 | | | 5.00 | 3.00 |

Table 8 shows aspherical coefficients in the third numerical embodiment.

TABLE 8

| Lens Surface | K | A | B | C | D | E | F |
|---|---|---|---|---|---|---|---|
| 4 | −0.240629 | −5.2262E−03 | −2.5112E−04 | −3.8455E−06 | 3.3605E−06 | 0.0000E+00 | 0.0000E+00 |
| 5 | −0.587173 | 5.8501E−04 | −1.7806E−03 | −7.6955E−04 | 1.1938E−04 | 1.8967E−05 | 0.0000E+00 |
| 6 | 0.069558 | −3.2157E−03 | −1.6822E−03 | −9.1619E−05 | −4.5366E−05 | 2.9670E−05 | 0.0000E+00 |
| 7 | 1.507663 | −1.6815E−02 | −1.0232E−03 | 1.1053E−05 | 3.4726E−05 | −3.1408E−05 | 0.0000E+00 |
| 8 | −0.927034 | 3.9944E−03 | 1.8669E−04 | −3.3076E−04 | 2.6678E−04 | −9.0119E−05 | 0.0000E+00 |
| 9 | 5.513360 | −2.3585E−03 | 1.4131E−03 | 4.3892E−04 | −6.2411E−05 | −3.4756E−05 | 0.0000E+00 |
| 10 | −1.819618 | −1.2587E−03 | 1.0797E−03 | 1.3699E−04 | −4.7728E−05 | 1.1538E−06 | 0.0000E+00 |
| 11 | −4.847166 | 2.7239E−04 | −1.9728E−03 | 2.4930E−04 | −7.7668E−05 | 4.9405E−06 | 0.0000E+00 |
| 12 | −6.131022 | 3.8885E−03 | 1.0018E−03 | −6.0222E−04 | 1.1799E−04 | −1.6173E−05 | 0.0000E+00 |
| 13 | 0 | 1.6403E−02 | 1.0513E−03 | 6.0477E−04 | −3.3953E−04 | 1.1336E−04 | −7.3191E−08 |
| 14 | −1.675960 | 1.2492E−02 | −1.9728E−03 | 1.9339E−04 | −3.2795E−05 | 2.4414E−05 | 0.0000E+00 |
| 15 | −11.995560 | 5.3112E−03 | −1.8576E−03 | 7.9294E−04 | −4.3383E−04 | 1.0860E−04 | 0.0000E+00 |
| 16 | 8.032881 | −4.6141E−02 | 1.6697E−02 | −5.9468E−03 | 1.0866E−03 | 0.0000E+00 | 0.0000E+00 |
| 17 | −23.188918 | −3.3939E−02 | 1.0682E−02 | −3.0522E−03 | 5.5085E−04 | −4.0133E−05 | 0.0000E+00 |

Table 9 shows variable distances D1, D2, and D3, a focal length, and F-number at the wide angle position and the telephoto position in the third numerical embodiment.

TABLE 9

|  | Wide Angle End | Telephoto End |
|---|---|---|
| D1 | 1.988 | 0.650 |
| D2 | 1.062 | 0.400 |
| D3 | 0.759 | 2.754 |
| focal length | 6 | 9 |
| Fno | 2.16 | 2.88 |

For example, in the third numerical embodiment, when the length of an optical path of the wide-angle optical lens assembly is about 4.5 mm, the size of the image circle is Φ5.0 or less and the short side length of the image circle is about 3.0 mm or less. Accordingly, the height of the short side of the image sensor according to the third numerical embodiment may be configured to be less than the length of the optical path of the wide-angle optical lens assembly.

In the present embodiment, the optical lens assembly may be mounted on a compact mobile device in a configuration such that the ratio between the effective diameter Ld of the lens closest to the image side at the wide angle position and the diameter D of the image circle is about 0.826 and the total length of the optical path is about 16.85 mm.

Figure 10:
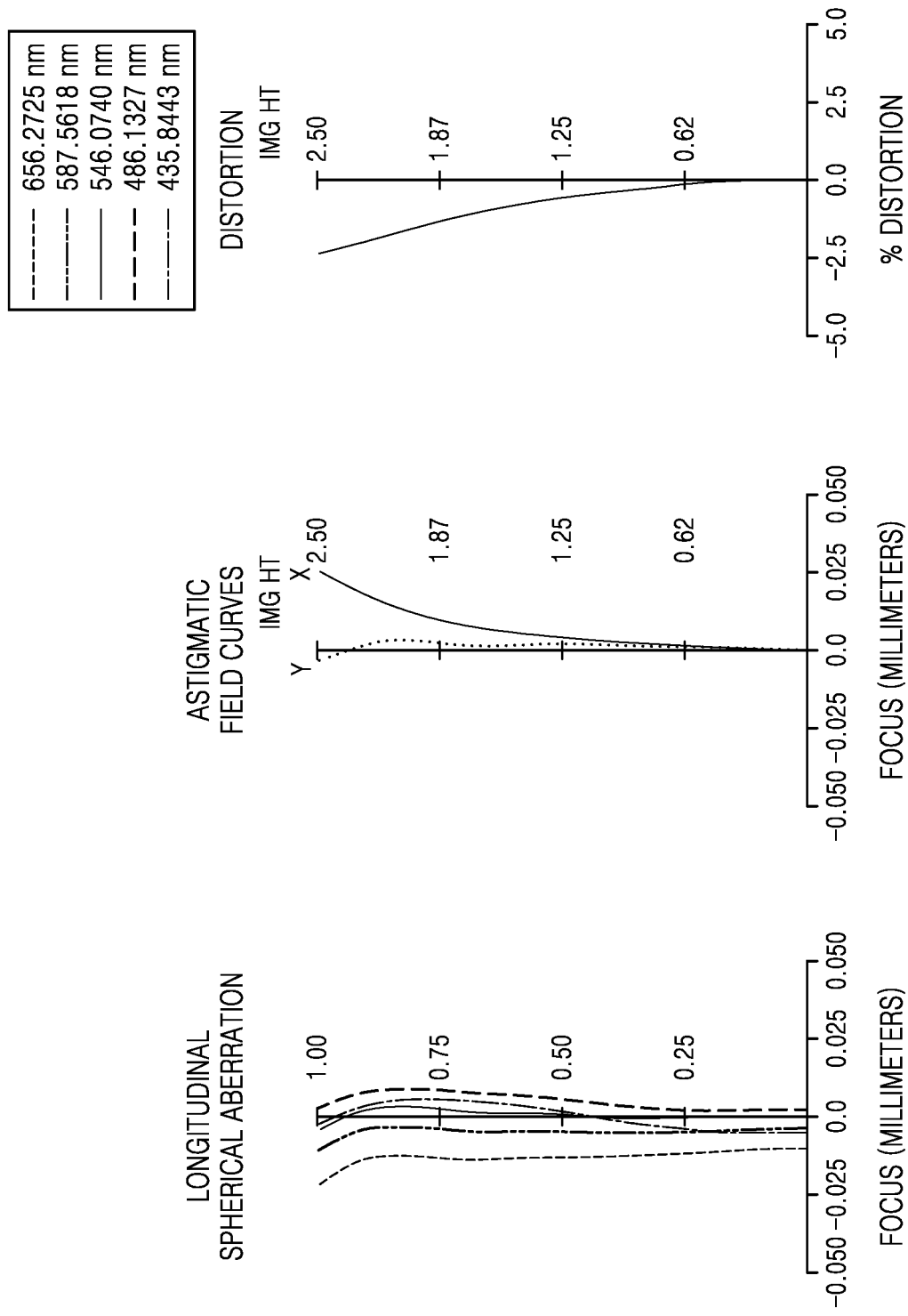
FIG. 10 is an aberration diagram at a wide angle position of the optical lens assembly of the third numerical embodiment according to various embodiments.

FIG. 10 illustrates longitudinal spherical aberration, astigmatic field curves, and distortion of the optical lens assembly 100-3 at the wide angle position, according to the third numerical embodiment of the present disclosure.

Figure 11:
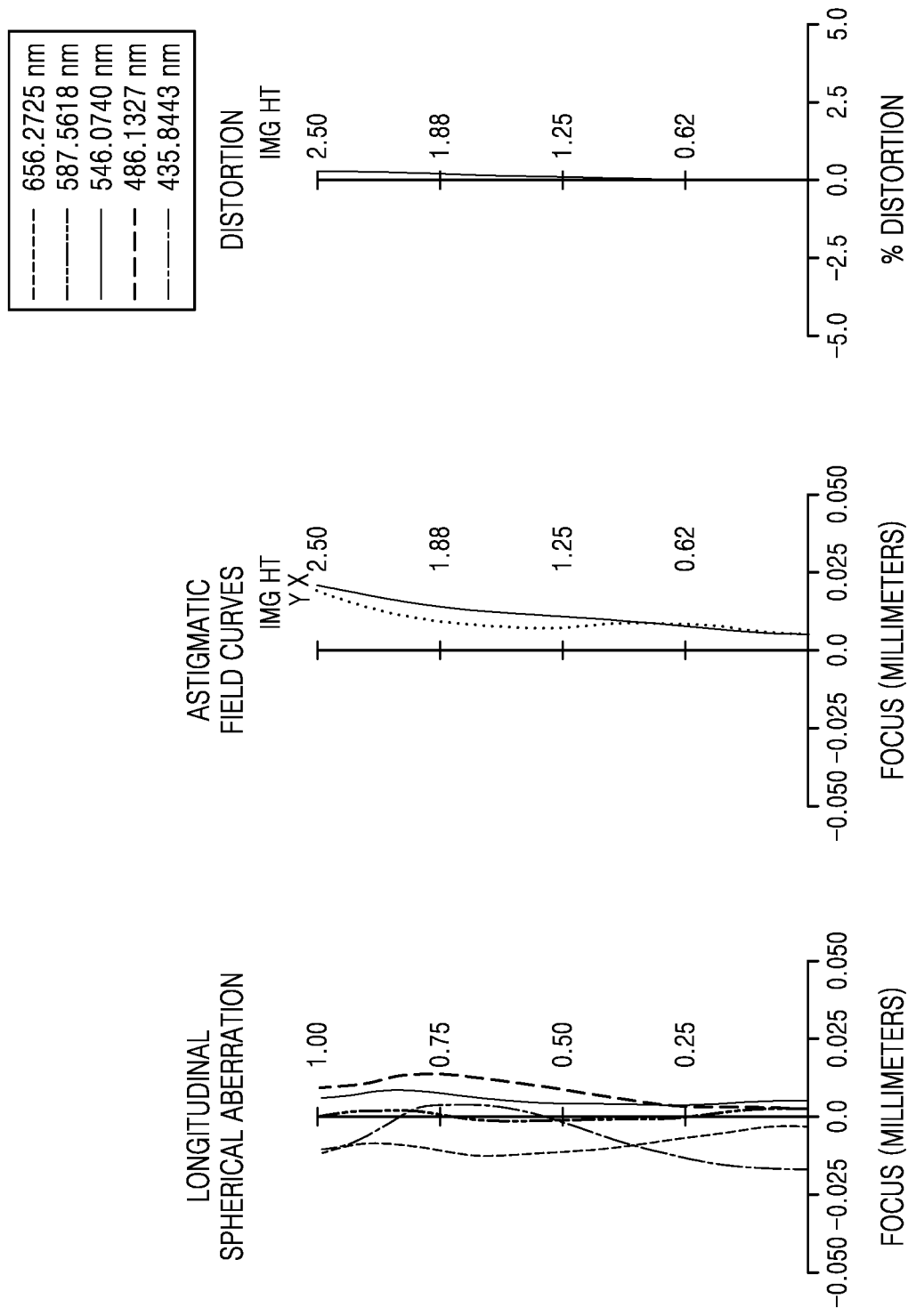
FIG. 11 is an aberration diagram at a telephoto position of the optical lens assembly of the third numerical embodiment according to various embodiments.

FIG. 11 illustrates longitudinal spherical aberration, astigmatic field curves, and distortion of the optical lens assembly 100-2 at the telephoto position, according to the third numerical embodiment of the present disclosure.

Fourth Numerical Embodiment

FIG. 12 illustrates the optical lens assembly 100-4 of the fourth numerical embodiment according to various embodiments. Table 10 shows, for example, design data of the fourth numerical embodiment.

TABLE 10

| Lens Surface | Lens Surface Type | R | Dn | Nd | Vd | Effective Diameter | Short-Side Effective Diameter |
|---|---|---|---|---|---|---|---|
| 1 |  | infinity | 2.3 | 1.84666 | 23.8 |  |  |
| 2 | Reflect | infinity | 2.3 | 1.84666 | 23.8 |  |  |
| 3 |  | infinity | 0.5 |  |  |  |  |
| 4 | Asphere | 7.9385892 | 0.641 | 1.53113 | 55.7 | 3.88 | 3.50 |
| 5 | Asphere | 3.2239766 | 0.185 |  |  | 3.50 | 3.20 |
| 6 | Asphere | 3.3073589 | 1.338 | 1.65038 | 21.5 | 3.50 | 3.21 |
| 7 | Asphere | 2.9002466 | D1 |  |  | 3.09 | 2.93 |
| 8 | Asphere | 2.6448303 | 0.608 | 1.5441 | 56.1 | 3.08 | 3.08 |
| 9 | Asphere | 4.5584829 | 0.100 |  |  | 3.05 | 3.06 |
| 10 | Asphere | 3.716604 | 1.056 | 1.53113 | 55.7 | 3.09 | 3.10 |
| 11 | Asphere | −3.067665 | 0.100 |  |  | 3.02 | 3.03 |
| 12 | Asphere | −3.688983 | 0.300 | 1.614425 | 26 | 2.92 | 2.94 |
| 13 | Asphere | 14.201739 | D2 |  |  | 2.83 | 2.86 |
| 14 | Asphere | 5.5714788 | 0.554 | 1.5441 | 56.1 | 3.60 | 3.14 |
| 15 | Asphere | 9.6803611 | D3 |  |  | 3.45 | 3.11 |
| 16 | Asphere | −19.22145 | 0.746 | 1.614425 | 26 | 3.54 | 3.09 |
| 17 | Asphere | −3.449064 | 0.734 |  |  | 3.50 | 3.02 |
| 18 | Asphere | −7.082473 | 0.400 | 1.53113 | 55.7 | 3.61 | 2.79 |
| 19 | Asphere | 3.228477 | D4 |  |  | 4.30 | 2.90 |

TABLE 10-continued

| Lens Surface | Lens Surface Type | R | Dn | Nd | Vd | Effective Diameter | Short-Side Effective Diameter |
|---|---|---|---|---|---|---|---|
| 20 | Sphere | 1.00E+18 | 0.110 | 1.5168 | 64.2 | 5.17 | 3.17 |
| 21 | Sphere | 1.00E+18 | 0.300 | | | 5.21 | 3.18 |
| 22 | Image | 1.00E+18 | 0.000 | | | 5.40 | 3.24 |

Table 11 shows aspherical coefficients in the fourth numerical embodiment.

TABLE 11

| Lens Surface | K | A | B | C | D | E |
|---|---|---|---|---|---|---|
| 4 | 7.4584894 | 2.5289E−03 | −2.3420E−03 | −4.1853E−06 | 4.1640E−05 | −4.8447E−06 |
| 5 | 1.0054729 | 4.1325E−03 | −2.6887E−03 | −6.6011E−04 | 1.7194E−04 | −2.3033E−05 |
| 6 | −1.932631 | −1.6212E−03 | 1.8680E−04 | 1.5080E−04 | −8.2691E−05 | 1.1566E−05 |
| 7 | 1.1924641 | −2.7671E−02 | −7.7621E−05 | −3.1753E−04 | 2.7533E−05 | −3.7694E−05 |
| 8 | −1.140354 | 4.2342E−03 | 6.6613E−04 | −1.4083E−04 | 1.8925E−04 | −4.8247E−05 |
| 9 | −6.946002 | −4.2803E−03 | 5.7760E−04 | 4.0577E−04 | 8.2893E−05 | −4.5775E−05 |
| 10 | −3.353951 | −2.0210E−03 | 1.3445E−03 | 2.0019E−04 | −2.0708E−04 | 5.0887E−05 |
| 11 | −6.172245 | 3.0559E−03 | −1.8411E−03 | 3.1805E−05 | 7.0063E−05 | −3.0138E−06 |
| 12 | −3.701479 | 5.6383E−04 | 8.4854E−04 | −1.6342E−06 | −5.8020E−05 | −8.0933E−06 |
| 13 | 62.344856 | −5.3065E−04 | 8.2473E−03 | −8.5866E−04 | −1.9595E−04 | 5.1666E−05 |
| 14 | −0.836551 | −6.6213E−04 | −3.0366E−05 | 4.0111E−04 | −1.4197E−04 | 5.5688E−06 |
| 15 | −7.842007 | −3.6500E−03 | −9.9053E−04 | 5.2093E−04 | −1.1273E−04 | −3.5169E−06 |
| 16 | −9.994836 | 1.5768E−02 | −2.5044E−03 | 5.9364E−04 | 3.1097E−05 | 0.0000E+00 |
| 17 | −7.93949 | 8.1561E−03 | −3.8325E−03 | 2.2354E−03 | −5.7475E−04 | 8.9498E−05 |
| 18 | 5.7229186 | −6.3607E−02 | 1.7717E−02 | −3.2201E−03 | 3.7714E−04 | −1.2175E−05 |
| 19 | −13.62852 | −4.6852E−02 | 1.6045E−02 | −3.3737E−03 | 4.4263E−04 | −2.5918E−05 |

Table 12 shows variable distances D1, D2, and D3, a focal length, and F-number at the wide angle position and the telephoto position in the fourth numerical embodiment.

TABLE 12

| | Wide Angle End | Telephoto End |
|---|---|---|
| D1 | 1.801 | 0.312 |
| D2 | 0.390 | 1.879 |
| D3 | 1.889 | 0.400 |
| D4 | 0.750 | 2.235 |
| focal length | 6 | 9 |
| Fno | 2.2 | 2.85 |

For example, in the fourth numerical embodiment, when the length of an optical path of the wide-angle optical lens assembly is about 5 mm, the size of the image circle is Φ5.4 or less and the short side length of the image circle is about 3.24 mm or less. Accordingly, the height of the short side of the image sensor according to the fourth numerical embodiment may be configured to be less than the length of the optical path of the wide-angle optical lens assembly.

Furthermore, to make the thickness of the optical lens assembly according to the present embodiment less than the short side height of the image sensor, the effective diameter of each lens is configured to be less than the size of the image circle, that is, Φ5.4, so that the short-side effective diameter of each lens may be miniaturized.

In the present embodiment, during zooming, the sixth lens L64 that is fixed has positive refractive power and an Abbe number of 50 or more, such that when an effective diameter of each lens is less than the size of the image circle, chromatic aberration in an overall area from the wide angle position to the telephoto position may be reduced. Furthermore, astigmatism and astigmatic field curves occurring during zooming may be efficiently reduced.

In the present embodiment, the optical lens assembly may be mounted on a compact mobile device in a configuration such that the ratio between the effective diameter Ld of the lens closest to the image side at the wide angle position and the diameter D of the image circle is about 0.796 and the total length of the optical path is about 13 mm.

Figure 13:
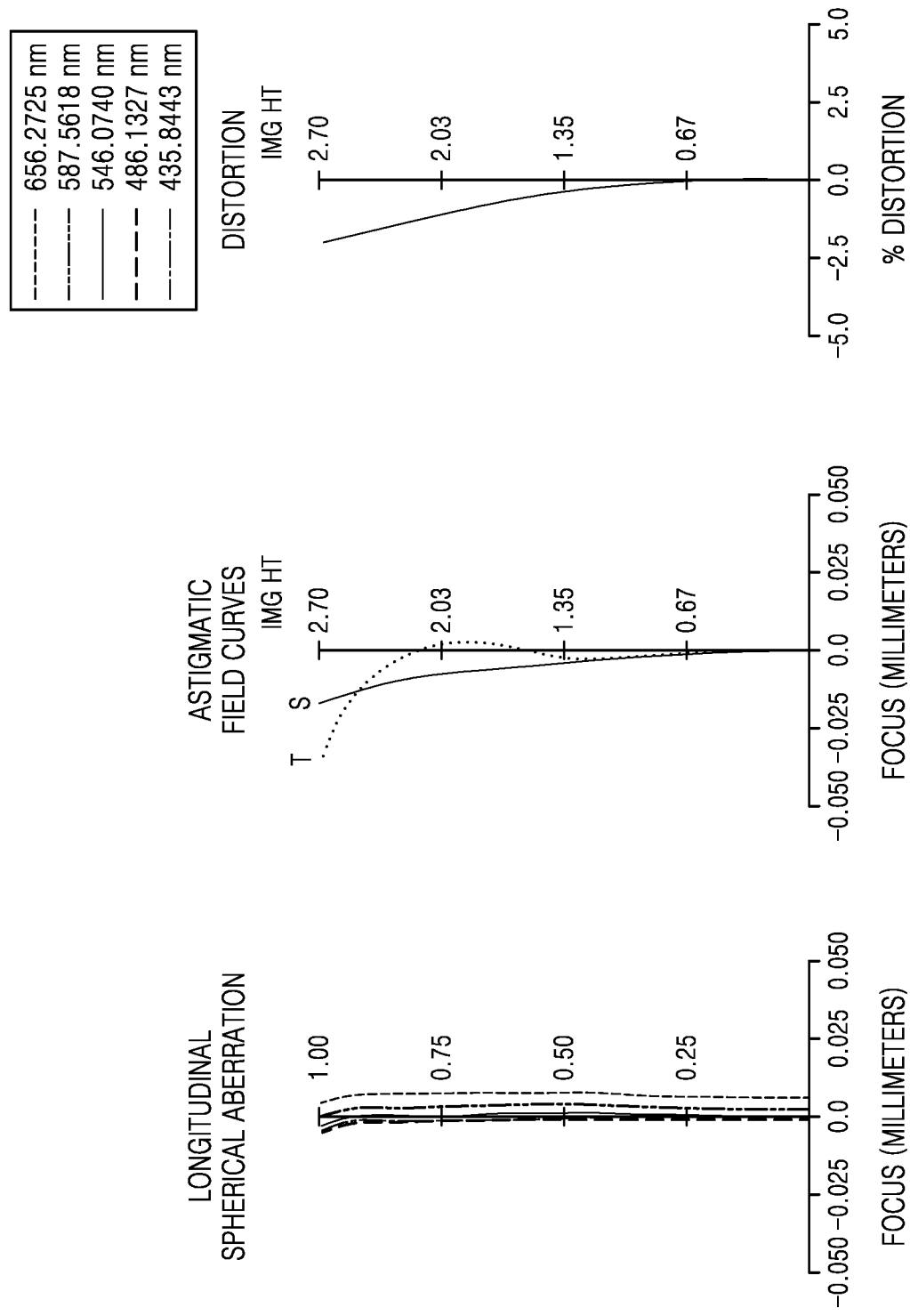
FIG. 13 is an aberration diagram at a wide angle position of the optical lens assembly of the fourth numerical embodiment according to various embodiments.

FIG. 13 illustrates longitudinal spherical aberration, astigmatic field curves, and distortion of the optical lens assembly 100-4 at the wide angle position, according to the fourth numerical embodiment of the present disclosure.

Figure 14:
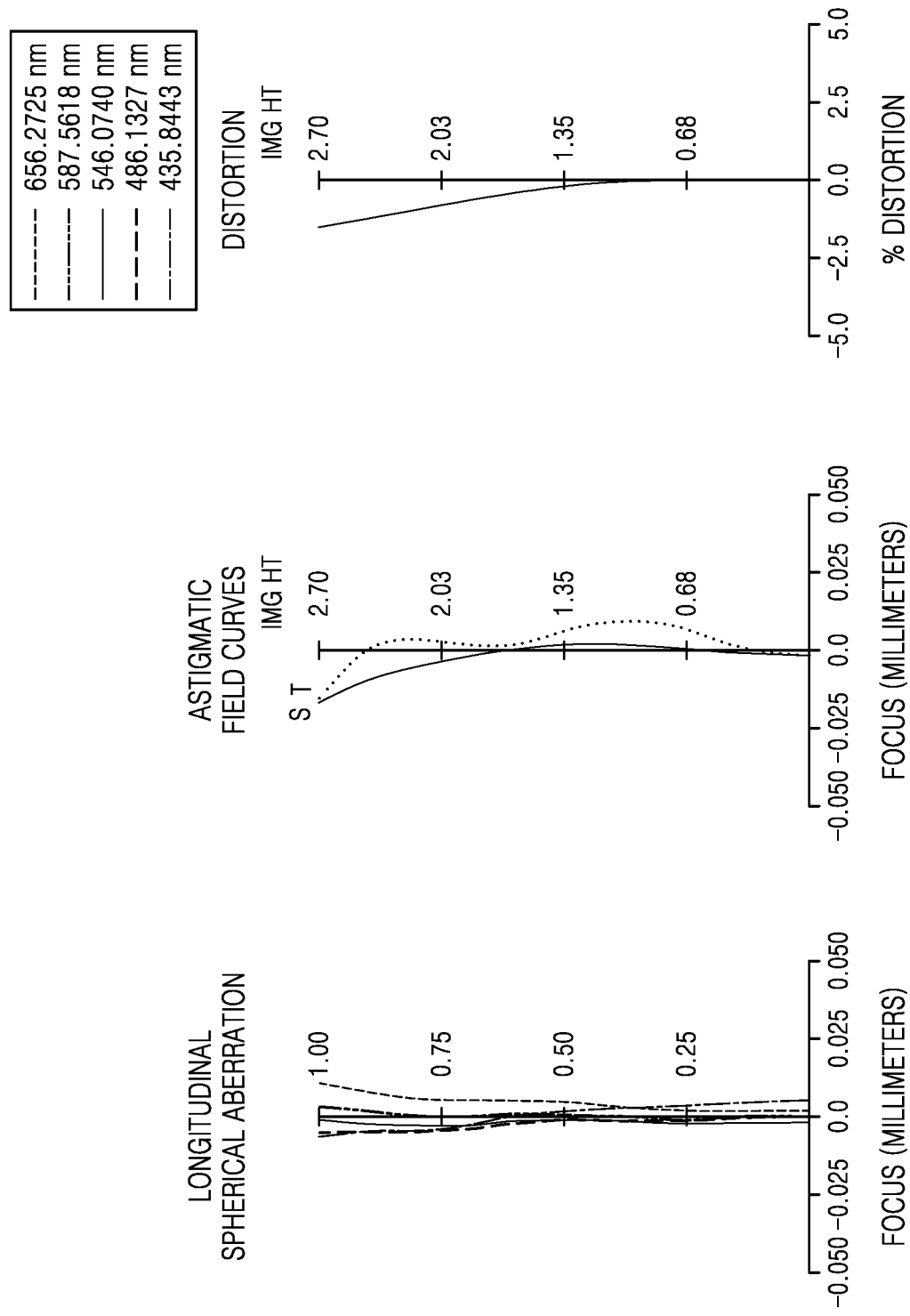
FIG. 14 is an aberration diagram at a telephoto position of the optical lens assembly of the fourth numerical embodiment according to various embodiments.

FIG. 14 illustrates longitudinal spherical aberration, astigmatic field curves, and distortion of the optical lens assembly 100-4 at the telephoto position, according to the fourth numerical embodiment of the present disclosure.

Various optical lens assemblies may be applied to a compact mobile device to obtain a high-resolution zoom image. For example, the electronic apparatus according to various embodiments may include a wide-angle optical lens assembly and a zoom optical lens assembly as a dual module. In a compact mobile device, to obtain a zoom image, two or more optical lens assemblies are mounted, and to obtain a zoom image at an intermediate area from the wide angle position to the telephoto position, without image deterioration, an optical zoom lens having a bending unit may be used as the telephoto optical lens assembly. In various embodiments, while obtaining a high-resolution zoom image, the optical zoom lens assembly having a lens that maintains bright Fno may be mounted on a compact mobile electronic apparatus.

The optical lens assembly according to various embodiments may be applied to cameras used for obtaining a zoom image in compact or portable multifunctional apparatuses such as mobile phones or smartphones. For example, the optical lens assembly according to various embodiments may be used for tablet computing devices, notebooks, netbooks, sub-notebooks, or ultrabook computers. Furthermore, to obtain a zoom image of a higher magnification, for example, a dual camera or a multi camera may be configured with a wide-angle lens camera or one or more different camera modules, and may be mounted on a compact electronic apparatus.

Figure 20:
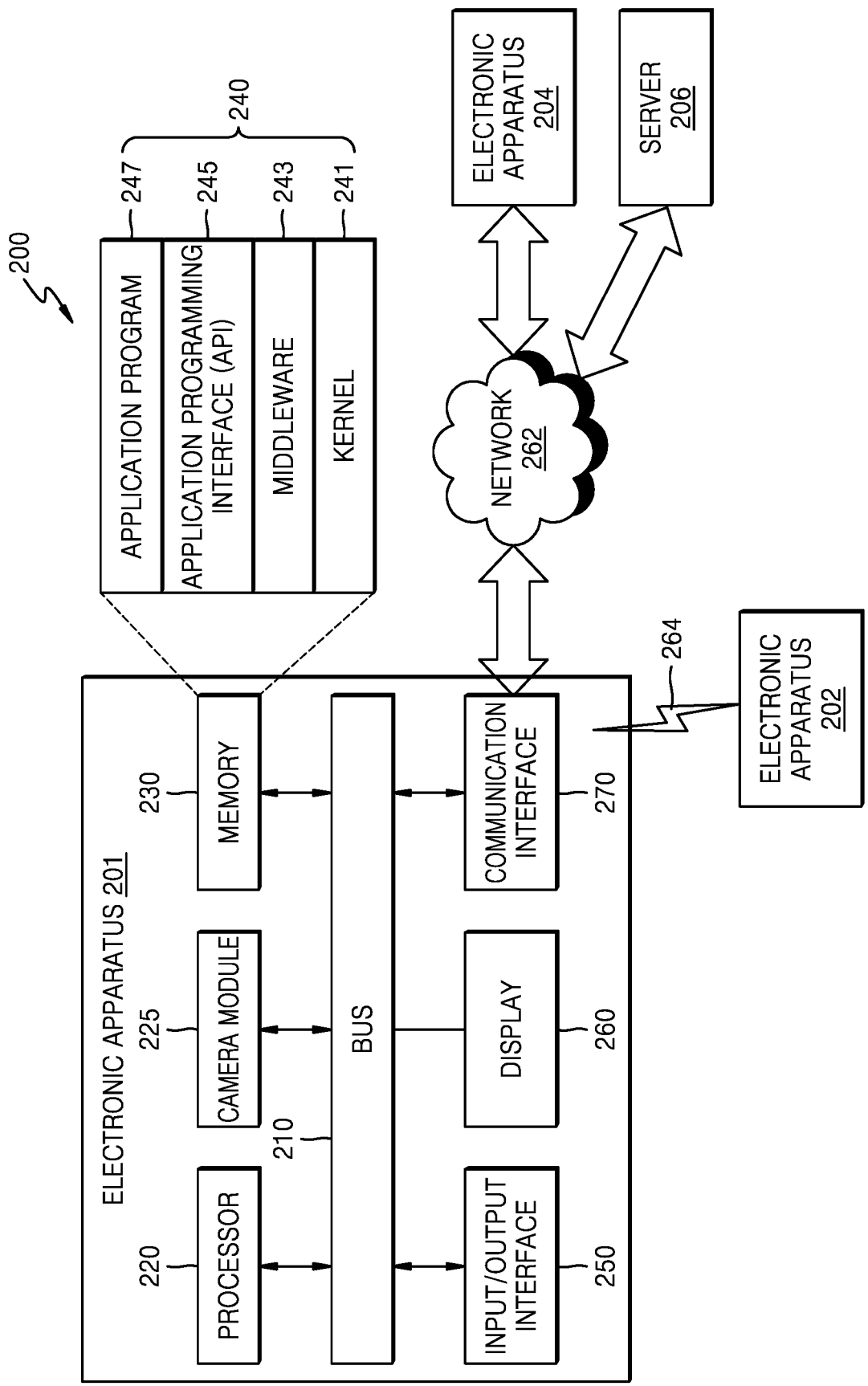
FIG. 20 illustrates a network environment system according to various embodiments.

Referring to FIG. 20, an electronic apparatus 201 according to various embodiments is provided in a network environment 200. The electronic apparatus 201 may include a bus 210, a processor 220, a camera module 225, a memory 230, an input/output interface 250, a display 260, and a communication interface 270. In an embodiment, the electronic apparatus 201 may omit at least one of constituent elements thereof or may further include other constituent elements.

The bus 210 may connect, for example, constituent elements 210 to 270 to one another, and may include a circuit for communication, for example, transmitting control messages and/or data, between constituent elements.

The processor 220 may include one or more of a central processing unit (CPU), an application processor (AP), or a communication processor (CP). The processor 220 may perform operations or data processing regarding control and/or communication of, for example, at least one of other constituent elements of the electronic apparatus 201.

The camera module 225 may be a device capable of capturing, for example, a still image and a video, and according to an embodiment, may include one or more image sensors, for example, a front sensor or a rear sensor, a lens, an image signal processor (ISP), or a camera flash, for example, an LED or xenon lamp. For example, the optical lens assembly according to various embodiments may be applied to the camera module 225.

The memory 230 may include volatile memory and/or non-volatile memory. The memory 230 may store, for example, instructions or data related to at least one of other constituent elements of the electronic apparatus 201. According to an embodiment, the memory 230 may store software and/or a program 240. The program 240 may include, for example, a kernel 241, middleware 243, an application programming interface (API) 245, and/or an application program (or "application") 247. At least some of the kernel 241, the middleware 243, and the API 245 may be referred to as an operating system (OS).

The kernel 241 may control or manage, for example, system resources such as the bus 210, the processor 220, or the memory 230 used to perform an operation or function implemented in other programs such as the middleware 243, the API 245, or the application program 247. Furthermore, the kernel 241 may provide an interface for controlling or managing system resources by allowing the middleware 243, the API 245, or the application program 247 to access an individual constituent element of the electronic apparatus 201.

The middleware 243 may perform intermediation so that, for example, the API 245 or the application program 247 may exchange data by communicating with the kernel 241.

Furthermore, the middleware 243 may process one or more job requests received from the application program 247 according to priority. For example, the middleware 243 may allot at least one of the application programs 247 a priority to use system resources such as the bus 210, the processor 220, or the memory 230 of the electronic apparatus 201. For example, the middleware 243 may perform scheduling or load balancing with respect to the one or more job requests, by processing the one or more job requests according to the priority allotted to the at least one of the application programs 217.

The API 245 is an interface to provide functions provided by, for example, the application program 247 through the kernel 241 or the middleware 243, and may include, for example, at least one interface or function, such as instructions, for file control, window control, or character control.

The input/output interface 250 may serve as an interface to transmit, for example, commands or data input by a user or other external device, to other constituent element(s) of the electronic apparatus 201. Furthermore, the input/output interface 250 may output commands or data received from other constituent element(s) of the electronic apparatus 201 to a user or other external device.

The display 260 may include, for example, a liquid crystal display (LCD), a light-emitting diode (LED) display, an organic light-emitting diode (OLED) display, or a microelectromechanical systems (MEMS) display, or an electronic paper display. The display 260 may display, for example, various contents such as texts, images, videos, icons, or symbols to the user. The display 260 may include a touch screen and may receive, for example, touch, gesture, proximity, or hovering inputs using an electronic pen or a part of a user's body.

The communication interface 270 may set communication between, for example, the electronic apparatus 201 and an external device such as an electronic apparatus 202, an electronic apparatus 204, or a server 206. For example, the communication interface 270 may be connected to a network 262 via wireless communication or wired communication and communicate with an external device such as the second external electronic apparatus 204 or the server 206.

The wireless communication may use, for example, as a cellular communication protocol, for example, at least one of long-term evolution (LTE), LTE Advance (LTE-A), code division multiple access (CDMA), wideband CDMA (WCDMA), a universal mobile telecommunications system (UMTS), wireless broadband (WiBro), and a global system for mobile communications (GSM). Furthermore, the wireless communication may include, for example, a short-range communication. The short-range communication 264 may include, for example, at least one of wireless fidelity (WiFi), Bluetooth, near field communication (NFC), and global navigation satellite system (GNSS). The GNSS may include, according to a used area or a bandwidth, for example, at least one of a global positioning system (GPS), a global navigation satellite system (Glonass), a Beidou navigation satellite system (hereinafter, referred to as the "Beidou"), and Galileo or the European global satellite-based navigation system. In the present disclosure, "GPS" may be interchangeably used with "GNSS". The wired communication may include, for example, at least one of a universal serial bus (USB), a high definition multimedia interface (HDMI), recommended standard-232 (RS-232), and plain old telephone service (POTS). The network 262 may include a telecommunications network, for example, at least one of a computer network such as LAN or WAN, the Internet, and a telephone network.

Each of the first and second external electronic apparatuses 202 and 204 may be a device that is the same as or different from the electronic apparatus 201. According to an embodiment, the server 206 may include a group of one or more servers. According to various embodiments, all or part of operations performed on the electronic apparatus 201 may be performed on another electronic apparatus or a plurality of electronic apparatuses, for example, the electronic apparatuses 202 and 204 or the server 206. According to an embodiment, when the electronic apparatus 201 performs a certain function or service automatically or on a request, the electronic apparatus 201, instead of or in addition to performing the function or service therein, may request another device, for example, the first and second external electronic apparatuses 202 and 204, or the server 206 to perform at least part of the function related thereto. Another electronic apparatus, for example, the external electronic apparatuses 202 and 204 or the server 106, may perform the requested function or additional function and transmit a result thereof to the electronic apparatus 201. The electronic apparatus 201 may process a received result without change or additionally and provide the requested function or service. To this end, for example, cloud computing, distributed computing, or client-server computing technology may be used.

Figure 21:
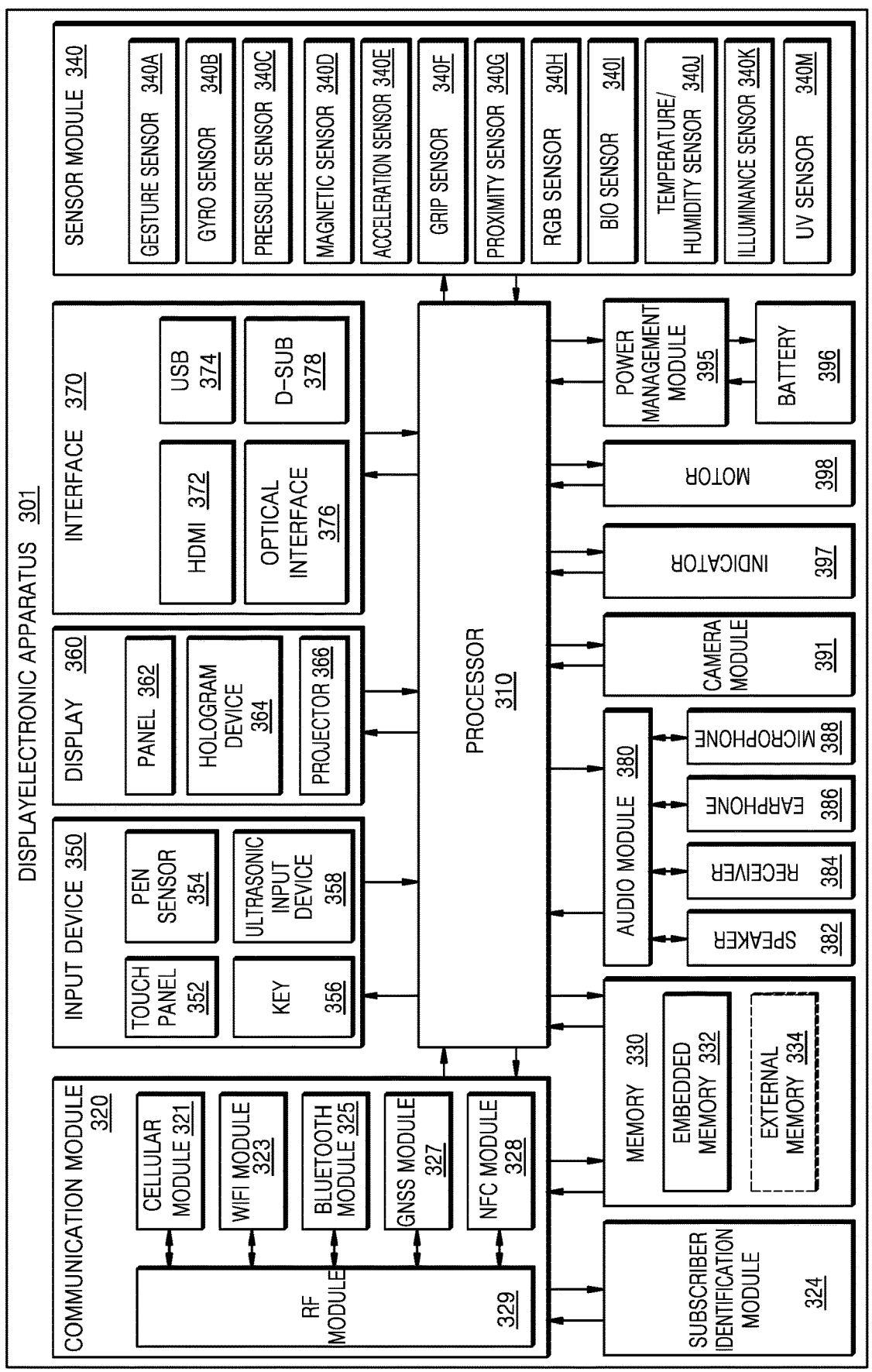
FIG. 21 is a block diagram of an electronic apparatus according to various embodiments.

FIG. 21 is a block diagram of an electronic apparatus 301 according to various embodiments. The electronic apparatus 301 may include, for example, the whole or part of the electronic apparatus 201 of FIG. 20. The electronic apparatus 301 may include one or more processors, for example, a processor or AP 310, a communication module 320, a subscriber identification module 324, a memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software constituent elements connected to the processor 310 by driving, for example, an operating system or an application program, and may perform various data processing and operations. The processor 310 may be implemented by, for example, a system-on-chip (SoC). According to an embodiment, the processor 310 may further include a graphics processing unit (GPU) and/or an image signal processor. The processor 310 may include at least part of the constituent elements of FIG. 20, for example, a cellular module 321. The processor 310 may process commands or data received from at least one of other constituent elements, for example, a non-volatile memory, by loading the commands or data on a volatile memory, and may store various pieces of data in the non-volatile memory.

The communication module 320 may have a configuration that is the same or similar to that of the communication interface 270 of FIG. 20. The communication module 320 may include, for example, the cellular module 321, a WiFi module 323, a Bluetooth module 325, a GNSS module 327 such as a GPS module, a Glonass module, a Beidou module, or a Galileo module, an NFC module 328, or a radio frequency (RF) module 329.

The cellular module 321 may provide, for example, a voice call, a video call, a text service, or the Internet service through a communication network. According to an embodiment, the cellular module 321 may perform classification and authentication of the electronic apparatus 301 in the communication network by using a subscriber identification module 324, for example, a SIM card. According to an embodiment, the cellular module 321 may perform at least some of functions provided by the processor 310. According to an embodiment, the cellular module 321 may include a communication processor CP.

Each of the WiFi module 323, the Bluetooth module 325, the GNSS module 327 and the NFC module 328 may include, for example, a processor for processing data transceived through a corresponding module. In some embodiments, at least two, for example, two or more, of the cellular module 321, the WiFi module 323, the Bluetooth module 325, the GNSS module 327, and the NFC module 328 may be included in one integrated chip IC or an IC package.

The RF module 329 may transceive, for example, a communication signal, for example, an RF signal. The RF module 329 may include, for example, a transceiver, a power amp module (PAM), a frequency filter, a low noise amplifier (LNA), or an antenna. In another embodiment, at least one of the cellular module 321, the WiFi module 323, the Bluetooth module 325, the GNSS module 327, and the NFC module 328 may transceive an RF signal through a separate RF module.

The subscriber identification module 324 may include, for example, a card and/or embedded SIM including a subscriber identification module, unique identification information, for example, an integrated circuit card identifier (IC-CID), or subscriber information, for example, international mobile subscriber identity (IMSI).

The memory 330, may include, for example, an embedded memory 332 or an external memory 334. The embedded memory 332 may include at least one of, for example, volatile memory such as dynamic RAM (DRAM), static RAM (SRAM), or synchronous dynamic RAM (SDRAM), and non-volatile memory such as one time programmable ROM (OTPROM), programmable ROM (PROM), erasable and programmable ROM (EPROM), electrically erasable and programmable ROM (EEPROM), mask ROM, flash ROM, flash memory, for example, NAND flash or NOR flash, hard disk drives, or solid state drives (SSD).

The external memory 334 may further include a flash drive such as compact flash (CF), secure digital (SD), micro secure digital (Micro-SD), mini secure digital (Mini-SD), extreme digital (xD), multi-media card (MMC), or memory stick. The external memory 334 may be functionally and/or physically connected with the electronic apparatus 301 via various interfaces.

The sensor module 340 may, for example, measure a physical quantity or detect an operational state of the electronic apparatus 301, and may convert measured or detected information to an electrical signal. The sensor module 340 may include at least one of, for example, a gesture sensor 340A, a gyro sensor 340B, a pressure sensor 340C, a magnetic sensor 340D, an acceleration sensor 340E, a grip sensor 340F, a proximity sensor 340G, a color sensor 340H, for example, red, green, and blue (RGB) sensors, a biosensor 340I, a temperature/humidity sensor 340J, an illuminance sensor 340K, or an ultra violet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit for controlling at least one of sensors provided therein. In an embodiment, the electronic apparatus 301 may further include a processor configured to control the sensor module 340, as a part of or separated from the processor 310, thereby controlling the sensor module 340 while the processor 310 is in a sleep state.

The input device 350 may include, for example, a touch panel 352, a (digital) pen sensor 354, a key 356, or an ultrasonic input device 358. The touch panel 352 may employ at least one of, for example, a capacitive method, a resistive method, an infrared method, and an ultrasonic method. Furthermore, the touch panel 352 may further include a control circuit. The touch panel 352 may further include a tactile layer and may provide a tactile response to a user.

The (digital) pen sensor 354 may include, for example, a recognition sheet that is a part of a touch panel or separate therefrom. The key 356 may include, for example, a physical button, an optical key, or a keypad. The ultrasonic input device 358 may detect ultrasound generated from an input device through a microphone, for example, the microphone 388, and check data corresponding to the detected ultrasound.

The display 360 may include a panel 362, a hologram device 364, or a projector 366. The panel 362 may include a configuration that is the same as or similar to the display 260 of FIG. 20. The panel 362 may be implemented to be, for example, flexible, transparent, or wearable. The panel 362 may be configured to be one module with the touch panel 352. According to an embodiment, the panel 362 may include a pressure sensor or a force sensor that may measure the intensity of pressure of a user's touch. The pressure sensor may be implemented as one or more sensors that are integral with the touch panel 352 or separate from the touch panel 352. The hologram device 364 may display a three-dimensional image in the air using interference of light. The projector 366 may display an image by projecting light onto a screen. The screen may be located, for example, inside or outside the electronic apparatus 301. According to an embodiment, the display 360 may further include a control circuit for controlling the panel 362, the hologram device 364, or the projector 366.

The interface 370 may include, for example, a high-definition multimedia interface (HDMI) 372, a universal serial bus (USB) 374, an optical interface 376, or a D-subminiature 378. The interface 370 may be included in, for example, the communication interface 270 of FIG. 20. Additionally or alternatively, the interface 370 may include, for example, a mobile high-definition link (MHL) interface, a secure digital (SD) card/a multi-media card (MMC) interface, or an infrared data association (IrDA) specification interface.

The audio module 380 may convert, for example, a sound and electrical signal in bi-direction. At least some constituent elements of the audio module 380 may be included into, for example, the input/output interface 250 of FIG. 20. The audio module 380 may process sound information input or output through, for example, a speaker 382, a receiver 384, earphones 386, or a microphone 388.

The camera module 391, which is a device for capturing, for example, a still image and a video, may include one or more image sensors, for example, a front sensor or a rear sensor, a lens, an image signal processor (ISP), or a camera flash, for example, an LED or xenon lamp. According to an embodiment, for example, the optical lens assembly according to various embodiments may be applied to the camera module 391.

The power management module 395 may manage electric power of, for example, the electronic apparatus 301. The electronic apparatus 301 may be an electronic apparatus that receives electric power through a battery, but the present disclosure is not limited thereto. According to an embodiment, the power management module 395 may include a power management integrated circuit (PMIC), a charger integrated circuit (IC), a battery, or a fuel gauge. The PMIC may have a wired and/or wireless charging system. A wireless charging system may include, for example, a magnetic resonance method, a magnetic induction method, or an electromagnetic wave method, and may further include an additional circuit for wireless charging, for example, a coil loop, a resonant circuit, or a rectifier. A battery gauge may measure, for example, a remaining amount, a voltage, current, or temperature during charging of the battery 396. The battery 396 may include, for example, a rechargeable battery and/or a solar battery.

The indicator 397 may display a particular state, for example, the processor 310, for example, a booting state, a message state, or a charge state, of the electronic apparatus 301 or a part thereof. The motor 398 may convert an electrical signal to mechanical vibration, thereby generating vibration or a haptic effect. Although not illustrated, the electronic apparatus 301 may include a processing device for supporting a mobile TV, for example, a GPU. The processing device for supporting a mobile TV may process media data according to specifications, for example, digital multimedia broadcasting (DMB), digital video broadcasting (DVB), or mediaFlo™.

Each of constituent elements described in the present disclosure may include one or more components, and the name of such a constituent element may vary according to the type of an electronic apparatus. In various embodiments, the electronic apparatus may include at least one of the constituent elements described in the present disclosure, and may omit some constituent elements or may further include additional other constituent elements. Furthermore, as some of constituent elements of the electronic apparatus according to various embodiments are coupled to form one entity, functions of the constituent elements before coupling may be performed in the same manner.

The term "module" used in various embodiments of the present disclosure may denote a unit including one or two or more combinations of, for example, hardware, software, or firmware. The module may be interchangeably used with terms for example, units, logics, logical blocks, components, or circuits. The module may be a standalone component that is integrally formed or a part thereof. The module may be embodied mechanically or electronically. For example, the modules according to various embodiments of the present disclosure may include at least one of an application-specific integrated circuit (ASIC) chip, field-programmable gate arrays (FPGAs), or a programmable-logic device, which performs a certain operation that is already known or will be developed in the future.

According to various embodiments, at least part of an apparatus, for example, modules or functions thereof, or a method, for example, operations, may be embodied by instructions stored in a computer-readable storage media in form of, for example, a programming module. When the instruction is executed by one or more processors, for example, the processor 220 of FIG. 20, the one or more processors may perform a function corresponding to the instruction. The computer-readable storage media may be, for example, the memory 230.

The optical lens assembly according to various embodiments including a plurality of lenses arranged from an object side toward an image side where an image sensor is disposed, includes a bending unit configured to reflect light input from the object side in a first direction toward a second direction; and a first lens group having negative refractive power, a second lens group having positive refractive power, and a third lens group having negative refractive power, which are arranged in the second direction in order from the bending unit toward the image side, wherein the first lens group includes a first lens having negative refractive power and disposed adjacent to the bending unit and a second lens having positive refractive power, the second lens group includes one or more lenses that are movable in the second direction, the third lens group is movable in the second direction and includes a third lens having positive refractive power and a fourth lens having negative refractive power, and an effective diameter of each of the first lens, the second lens, the one or more lenses included in the second lens group, the third lens, and the fourth lens is less than a diameter of an image circle of the image sensor.

The optical lens assembly may satisfy an inequality that Ld/D<0.85, wherein "Ld" denotes an effective diameter of the fourth lens closest to the image side in the optical lens assembly at a wide angle position, and "D" denotes a diameter of the image circle.

The optical lens assembly may satisfy an inequality that Lv/V<0.9, wherein "V" denotes a length of a short side of the image sensor at the wide angle position, and "Lv" denotes an effective diameter of light rays when the light rays pass through the fourth lens closest to the image side in the optical lens assembly and arrive at an end point of the short side of the image sensor at the wide angle position.

An overall length of an optical path of the optical lens assembly may be less than or equal to about 17 mm.

The first lens group may move and perform a focusing operation according to an object distance.

The first lens group, the second lens group, and the third lens group may move vertically and horizontally with respect to the second direction to perform camera shake compensation.

The bending unit tilts to perform camera shake compensation in a pitch direction, and the first lens group, the second lens group, and the third lens group may move horizontally with respect to the second direction to perform camera shake compensation in a yaw direction.

The first lens of the first lens group may have an Abbe number that is greater than 50, and the second lens of the first lens group may have an Abbe number that is less than 30.

The fourth lens of the third lens group may have an object side surface that is concave toward the object side.

A fifth lens may be further provided between the second lens group and the third lens group.

The fifth lens may be fixed during zooming.

Movement amounts of the second lens group and the third lens group during zooming may be the same.

All lenses included in the optical lens assembly may be plastic lenses.

An electronic apparatus according to various embodiments includes a first optical lens assembly having a first field of view, a first image sensor configured to obtain a first image signal by using light passing through the first optical lens assembly, a second optical lens assembly having a second field of view that is less than the first field of view, a second image sensor configured to obtain a second image signal by using light passing through the second optical lens assembly, and a processor, wherein the second optical lens assembly includes a bending unit configured to reflect light input from an object side in a first direction toward a second direction, a first lens group having negative refractive power, a second lens group having positive refractive power, and a third lens group having negative refractive power, which are arranged in the second direction in order from the bending unit toward an image side where the second image sensor is disposed, wherein the first lens group is disposed adjacent to the bending unit and includes a first lens having negative refractive power and a second lens having positive refractive power, the second lens group includes one or more lenses that are movable in the second direction, the third lens group is movable in the second direction and includes a third lens having positive refractive power and a fourth lens having negative refractive power, and an effective diameter of each of the first lens, the second lens, the one or more lenses included in the second lens group, the third lens, and the fourth lens is less than a diameter of an image circle of the second image sensor.

The first optical lens assembly may have a zoom ratio of a first section according to the first field of view, the second optical lens assembly may have a zoom ratio of a second section according to the second field of view, the processor may capture an image of an object using at least one of the first image sensor and the second image sensor, and the second lens group and the third lens group may be moved during the capturing of the image.

The zoom ratio of the first section may have a range of about 1 to 1.9 times, and the zoom ratio of the second section may have a range of about 2 to 3 times.

The electronic apparatus may satisfy an inequality that Ld/D<0.85, wherein "Ld" denotes an effective diameter of the fourth lens closest to the image side in the second optical lens assembly at a wide angle position, and "D" denotes a diameter of the image circle.

The electronic apparatus may satisfy an inequality that Lv/V<0.9, wherein "V" denotes a length of an image short side of the second image sensor in the second optical lens assembly at the wide angle position, and "Lv" denotes an effective diameter of light rays when the light rays pass through the fourth lens closest to the image side in the second optical lens assembly and arrive at an end point of the image short side of the second image sensor at the wide angle position.

An overall length of an optical path of the second optical lens assembly may be less than or equal to about 17 mm.

The electronic apparatus may satisfy that V/TTL_W<1, wherein "TTL_W" denotes an overall length of an optical path of the first optical lens assembly at the wide angle position, and "V" denotes a length of an image short side of the second image sensor in the second optical lens assembly at the wide angle position.

Examples of the computer-readable recording medium include magnetic media, e.g., hard disks, floppy disks, and magnetic tapes, optical media, e.g., compact disc read only memories (CD-ROMs) and digital versatile disks (DVDs), magneto-optical media, e.g., floptical disks, and hardware devices configured to store and execute program commands, for example, programming modules, e.g., read only memories (ROMs), random access memories (RAMs), flash memories, etc. Also, the program command may include not only machine code created by a compiler but also high-level programming language executable by a computer using an interpreter. The above-described hardware apparatuses may be configured to operate as one or more software modules to perform operations according to various embodiments of the present disclosure, or vice versa.

A module or programming module according to various embodiments of the present disclosure may include at least one of the above-described elements or the at least one of the above-described elements may be omitted or additional other elements may be further included. According to various embodiments of the present disclosure, operations may be performed by modules, programming modules, or other elements in a sequential, parallel, iterative, or heuristic method. Also, some operations may be performed in a different order, omitted, or other operations may be added thereto.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An optical lens assembly comprising a plurality of lenses arranged from an object side toward an image side where an image sensor is disposed, the optical lens assembly comprising:
   a bending unit configured to reflect light input from the object side in a first direction toward a second direction; and
   a first lens group having negative refractive power, a second lens group having positive refractive power, and a third lens group having negative refractive power, which are arranged in the second direction in order from the bending unit toward the image side,
   wherein the first lens group comprises a first lens having negative refractive power and disposed adjacent to the bending unit and a second lens having positive refractive power,
   the second lens group comprises one or more lenses that are movable in the second direction,
   the third lens group is movable in the second direction and comprises a third lens having positive refractive power and a fourth lens having negative refractive power, and
   an effective diameter of each of the first lens, the second lens, the one or more lenses included in the second lens group, the third lens, and the fourth lens is less than a diameter of an image circle of the image sensor,
   wherein the optical lens assembly satisfies a following inequality:

$Ld/D<0.85$, wherein "Ld" denotes an effective diameter of the fourth lens closest to the image side in the optical lens assembly at a wide angle position, and "D" denotes a diameter of the image circle.

2. An optical lens assembly comprising a plurality of lenses arranged from an object side toward an image side where an image sensor is disposed, the optical lens assembly comprising:
   a bending unit configured to reflect light input from the object side in a first direction toward a second direction; and
   a first lens group having negative refractive power, a second lens group having positive refractive power, and a third lens group having negative refractive power, which are arranged in the second direction in order from the bending unit toward the image side,
   wherein the first lens group comprises a first lens having negative refractive power and disposed adjacent to the bending unit and a second lens having positive refractive power,
   the second lens group comprises one or more lenses that are movable in the second direction,
   the third lens group is movable in the second direction and comprises a third lens having positive refractive power and a fourth lens having negative refractive power, and
   an effective diameter of each of the first lens, the second lens, the one or more lenses included in the second lens group, the third lens, and the fourth lens is less than a diameter of an image circle of the image sensor, and
   wherein the optical lens assembly satisfies a following inequality:

$Lv/V<0.9$, wherein "V" denotes a length of a short side of the image sensor at a wide angle position, and "Lv" denotes an effective diameter of light rays when the light rays pass through the fourth lens closest to the image side in the optical lens assembly and arrive at an end point of the short side of the image sensor at the wide angle position.

3. The optical lens assembly of claim 1, wherein an overall length of an optical path of the optical lens assembly is less than or equal to 17 mm.

4. The optical lens assembly of claim 1, wherein the first lens group moves and performs a focusing operation according to an object distance.

5. An optical lens assembly comprising a plurality of lenses arranged from an object side toward an image side where an image sensor is disposed, the optical lens assembly comprising:
   a bending unit configured to reflect light input from the object side in a first direction toward a second direction; and
   a first lens group having negative refractive power, a second lens group having positive refractive power, and a third lens group having negative refractive power, which are arranged in the second direction in order from the bending unit toward the image side,
   wherein the first lens group comprises a first lens having negative refractive power and disposed adjacent to the bending unit and a second lens having positive refractive power,
   the second lens group comprises one or more lenses that are movable in the second direction,
   the third lens group is movable in the second direction and comprises a third lens having positive refractive power and a fourth lens having negative refractive power, and
   an effective diameter of each of the first lens, the second lens, the one or more lenses included in the second lens group, the third lens, and the fourth lens is less than a diameter of an image circle of the image sensor, and
   wherein the first lens group, the second lens group, and the third lens group move vertically and horizontally with respect to the second direction to perform camera shake compensation.

6. An optical lens assembly comprising a plurality of lenses arranged from an object side toward an image side where an image sensor is disposed, the optical lens assembly comprising:
   a bending unit configured to reflect light input from the object side in a first direction toward a second direction; and
   a first lens group having negative refractive power, a second lens group having positive refractive power, and a third lens group having negative refractive power, which are arranged in the second direction in order from the bending unit toward the image side,
   wherein the first lens group comprises a first lens having negative refractive power and disposed adjacent to the bending unit and a second lens having positive refractive power,
   the second lens group comprises one or more lenses that are movable in the second direction,
   the third lens group is movable in the second direction and comprises a third lens having positive refractive power and a fourth lens having negative refractive power, and an effective diameter of each of the first lens, the second lens, the one or more lenses included in the second lens group, the third lens, and the fourth lens is less than a diameter of an image circle of the image sensor, and wherein the bending unit tilts to perform camera shake compensation in a pitch direction, and the first lens group, the second lens group, and the third lens group move horizontally with respect to the second direction to perform camera shake compensation in a yaw direction.

7. The optical lens assembly of claim 1, wherein the first lens of the first lens group has an Abbe number that is greater than 50, and the second lens of the first lens group has an Abbe number that is less than 30.

8. The optical lens assembly of claim 1, wherein the fourth lens of the third lens group has an object side surface that is concave toward the object side.

9. The optical lens assembly of claim 1, wherein a fifth lens is further provided between the second lens group and the third lens group.

10. The optical lens assembly of claim 9, wherein the fifth lens is fixed during zooming.

11. The optical lens assembly of claim 9, wherein movement amounts of the second lens group and the third lens group during zooming are the same.

12. The optical lens assembly of claim 1, wherein all lenses included in the optical lens assembly are plastic lenses.

13. An electronic apparatus, comprising:
a first optical lens assembly having a first field of view;
a first image sensor configured to obtain a first image signal by using light passing through the first optical lens assembly;
a second optical lens assembly having a second field of view that is less than the first field of view;
a second image sensor configured to obtain a second image signal by using light passing through the second optical lens assembly; and
a processor,
wherein the second optical lens assembly comprises:
a bending unit configured to reflect light input from an object side in a first direction toward a second direction,
a first lens group having negative refractive power, a second lens group having positive refractive power, and a third lens group having negative refractive power, which are arranged in the second direction in order from the bending unit toward an image side where the second image sensor is disposed,
wherein the first lens group is disposed adjacent to the bending unit and comprises a first lens having negative refractive power and a second lens having positive refractive power,
the second lens group comprises one or more lenses that are movable in the second direction,
the third lens group is movable in the second direction and comprises a third lens having positive refractive power and a fourth lens having negative refractive power, and
an effective diameter of each of the first lens, the second lens, the one or more lenses included in the second lens group, the third lens, and the fourth lens is less than a diameter of an image circle of the second image sensor,
wherein the first optical lens assembly has a zoom ratio of a first section according to the first field of view, the second optical lens assembly has a zoom ratio of a second section according to the second field of view, the processor captures an image of an object using at least one of the first image sensor and the second image sensor, and the second lens group and the third lens group are moved during the capturing of the image and wherein the zoom ratio of the first section has a range of 1 to 1.9 times, and the zoom ratio of the second section has a range of 2 to 3 times.

14. An electronic apparatus, comprising:
a first optical lens assembly having a first field of view;
a first image sensor configured to obtain a first image signal by using light passing through the first optical lens assembly;
a second optical lens assembly having a second field of view that is less than the first field of view;
a second image sensor configured to obtain a second image signal by using light passing through the second optical lens assembly; and
a processor,
wherein the second optical lens assembly comprises:
a bending unit configured to reflect light input from an object side in a first direction toward a second direction,
a first lens group having negative refractive power, a second lens group having positive refractive power, and a third lens group having negative refractive power, which are arranged in the second direction in order from the bending unit toward an image side where the second image sensor is disposed,
wherein the first lens group is disposed adjacent to the bending unit and comprises a first lens having negative refractive power and a second lens having positive refractive power,
the second lens group comprises one or more lenses that are movable in the second direction,
the third lens group is movable in the second direction and comprises a third lens having positive refractive power and a fourth lens having negative refractive power, and
an effective diameter of each of the first lens, the second lens, the one or more lenses included in the second lens group, the third lens, and the fourth lens is less than a diameter of an image circle of the second image sensor, and
wherein the second optical lens assembly satisfies a following inequality:

$$Ld/D<0.85,$$

wherein "Ld" denotes an effective diameter of the fourth lens closest to the image side in the second optical lens assembly at a wide angle position, and "D" denotes a diameter of the image circle.

15. The electronic apparatus of claim 13, wherein the second optical lens assembly satisfies a following inequality:

$$Lv/V<0.9,$$

wherein "V" denotes a length of an image short side of the second image sensor in the second optical lens assembly at a wide angle position, and "Lv" denotes an effective diameter of light rays when the light rays pass through the fourth lens closest to the image side in the second optical lens assembly and arrive at an end point of the image short side of the second image sensor at the wide angle position.

16. The electronic apparatus of claim 13, wherein an overall length of an optical path of the second optical lens assembly is less than or equal to 17 mm.

17. The electronic apparatus of claim 13, wherein the electronic apparatus satisfies V/TTL_W<1, wherein "TTL_W" denotes an overall length of an optical path of the first optical lens assembly at a wide angle position, and "V"

denotes a length of an image short side of the second image sensor in the second optical lens assembly at the wide angle position.

\* \* \* \* \*